US008684295B2

(12) United States Patent
Taketsuna

(10) Patent No.: US 8,684,295 B2

(45) Date of Patent: Apr. 1, 2014

(54) CORD REEL

(76) Inventor: Hidenobu Taketsuna, Kawachinagano (JP)

( * ) Notice: Subject to any disclaimer, the term of this patent is extended or adjusted under 35 U.S.C. 154(b) by 107 days.

(21) Appl. No.: 13/143,752

(22) PCT Filed: Dec. 3, 2009

(86) PCT No.: PCT/JP2009/070343

§ 371 (c)(1), (2), (4) Date: Aug. 15, 2011

(87) PCT Pub. No.: WO2010/079656

PCT Pub. Date: Jul. 15, 2010

(65) Prior Publication Data

US 2011/0284676 A1 Nov. 24, 2011

(30) Foreign Application Priority Data

Jan. 9, 2009 (JP) ................................ 2009-003613
Sep. 4, 2009 (JP) ................................ 2009-204356

(51) Int. Cl.
*B65H 75/48* (2006.01)

(52) U.S. Cl.
USPC .................................... 242/378.4; 242/385.4

(58) Field of Classification Search
USPC .............. 242/378, 378.4, 385, 385.4; 33/755, 33/757, 758, 759, 760, 770, 767
See application file for complete search history.

(56) References Cited

U.S. PATENT DOCUMENTS 1,465,281 A * 8/1923 Morrison .................. 242/375.3
2,169,734 A 8/1939 Hoppenstand (Continued)

FOREIGN PATENT DOCUMENTS

JP 43-8704 4/1968
JP 8-237349 9/1996
JP 10-139290 5/1998

OTHER PUBLICATIONS

International Search Report for International Application No. PCT/JP2009/070343 dated Dec. 18, 2009.

*Primary Examiner* — William A Rivera

(74) *Attorney, Agent, or Firm* — Kratz, Quintos & Hanson, LLP

(57) ABSTRACT

A cord reel configured in such a manner that the position of a cord reel body can be easily adjusted when the cord reel body is located at an intermediate portion of cords. A cord reel is provided with a first bobbin (4) and a second bobbin (5) on which respective cords (2) are wound, bobbin impelling means (6) for always impelling both the bobbins (4, 5) in the take-up direction, and a bobbin interlock means (7) for interlocking both the bobbins (4, 5) together, the bobbin interlock means (7) being configured in such a manner that, when both the cords (2) are not being operated in the pay-out direction, the bobbin interlock means (7) restricts rotation of both the bobbins (4, 5) in the take-up direction, that, when the cords (2) are operated in the pay-out direction by an operating force not greater than a preset value, the bobbin interlock means (7) allows one of the bobbins to rotate in the pay-out direction and allows the other bobbin to rotate in the take-up direction in association with the rotation of said bobbin, and that, when a cord (2) is operated in the pay-out direction by an operating force greater than the preset value, the bobbin interlock means (7) releases the interlock between both the bobbins (4, 5) to cause only the operated bobbin to rotate in the payout direction.

7 Claims, 16 Drawing Sheets

(56) References Cited

U.S. PATENT DOCUMENTS

| | | | | |
|---|---|---|---|---|
| 2,197,691 | A | 4/1940 | Gerlach | |
| 2,240,753 | A * | 5/1941 | Tremblay et al. | 33/764 |
| 3,885,314 | A * | 5/1975 | Banas, Sr. | 33/27.03 |
| 4,506,446 | A * | 3/1985 | Mitchell | 33/762 |
| 6,276,069 | B1 * | 8/2001 | Chadwick et al. | 33/512 |
| 6,416,005 | B1 * | 7/2002 | Liao | 242/378.1 |
| 6,520,444 | B1 * | 2/2003 | Muller | 242/378.4 |
| 6,619,449 | B2 * | 9/2003 | Liao | 191/12.2 R |
| 8,365,887 | B2 * | 2/2013 | Fischer | 191/12.2 R |
| 2004/0200920 | A1 * | 10/2004 | Wei | 242/378.4 |
| 2006/0261203 | A1 * | 11/2006 | Yang | 242/378.4 |
| 2007/0119999 | A1 * | 5/2007 | Liao | 242/378.4 |
| 2012/0153065 | A1 * | 6/2012 | Fischer | 242/379 |

* cited by examiner

CORD REEL

TECHNICAL FIELD

The present invention relates to a cord reel which is capable of taking up various types of cords such as an earphone cord, a USB cable and the like (hereinafter, just referred to as a cord).

BACKGROUND ART

There has widely been put to practical use a cord reel which is provided with a cord such as an earphone cord, a USB cable and a cord reel body which can take up and pay out the cord, wherein the cord reel body includes a bobbin on which the cord is wound, a rotation shaft which rotatably supports the bobbin, a biasing means which continuously biases the bobbin in a take-up direction of the cord, a one-way clutch which restricts rotation of the bobbin in the take-up direction and allows the bobbin to rotate in a pay-out direction, and a releasing means which releases the restriction of the rotation of the bobbin by the one-way clutch.

Further, there has also been proposed and put to practical use a cord reel in which a midway portion of the cord is fixed on the bobbin and one side and the other side of the cord are wound on the bobbin in opposite directions with respect to each other so as to take up and pay out both of the sides of the cord with respect to one bobbin at the same time, thereby omitting an electrical connecting portion such as a brush (see Patent Document 1, for example).

Furthermore, there has also been proposed a cord reel which is provided with two bobbins on which two cords are individually wound, a rotation shaft which coaxially supports both of the bobbins so as to be rotatable, two biasing means which continuously and individually bias both of the bobbins in a take-up direction of the respective cords, two one-way clutches which individually restrict rotation of the respective bobbins in the take-up direction and individually allow the respective bobbins to rotate in a pay-out direction, and two releasing means which individually release the restriction of the rotation of the respective bobbins by the one-way clutches to thereby individually take up and pay out the cords wound on each of the bobbins (see Patent Document 2, for example).

CITATION LIST

Patent Literature

Patent Document 1: JP-A No. H8-237349
Patent Document 2: JP-A No. H10-139290

SUMMARY OF INVENTION

Technical Problem

In the cord reel described in the above-described Patent Document 1, it is possible to substantially simplify the structure of the cord reel because an electrical connecting portion such as a brush can be omitted. However, a large cord reel body including the bobbin is located at a generally central portion in a length direction of the cord in such a state that the cord has been paid out and the position of the cord reel body cannot be adjusted with respect to the length direction of the paid out cord, thereby creating the following problems. Namely, when this cord reel is applied to an earphone cord of a cellular phone or a portable audio device, for example, it is unavoidable for the large massive cord reel body to be placed in a noticeable position at a generally central position between the device such as a cellular phone or a portable audio device put in a pocket of clothes and the like and an earphone worn in an ear. In this case, the cord reel body may detract from the appearance of clothes. Further, even if the cord reel body can be arranged at a position not to detract from the appearance of clothes, since the cord reel body is located at the central portion of the paid out cord, if a length of one of the sides of the cord is appropriately set so as to fix the cord reel body in the position not to detract from the appearance of clothes, the other side of the cord is excessively paid out. As a result of this, there has been such a problem that the excessively paid out cord detracts from the appearance of clothes or is likely to be caught on other objects.

On the other hand, in the cord reel described in the above-described Patent Document 2, it is possible to adjust a position of the cord reel body so as not to disturb various operations and also not to detract from the appearance of clothes because the cords can be individually taken up and paid out with respect to the two bobbins. However, it is necessary to individually adjust a length of each of the cords to be paid out from the two bobbins. Further, when a length of one of the cords is adjusted, a total length of the cords is changed. Therefore, when adjusting the position of the cord reel body without changing the total length of the cords, it is necessary to carry out two operations, namely a pay-out operation of the cord from one of the bobbins and a take-up operation of the cord on the other bobbin. Accordingly, there has been such a problem that an adjusting operation of the position of the cord reel body in a midway portion of the cords becomes cumbersome.

It is an object of the present invention to provide a cord reel which makes it possible to easily adjust a position of a cord reel body in a midway portion of cords.

Solution to Problem

A cord reel according to the present invention is provided with two cords and a cord reel body being capable of individually taking up and paying out the two cords, the cord reel body including a first bobbin and a second bobbin on which the respective cords are wound, a bobbin biasing means for continuously biasing the first bobbin and the second bobbin in a take-up direction, a bobbin interlock means for interlocking the first bobbin and the second bobbin, the bobbin interlock means being configured to interlock the first bobbin and the second bobbin in such a manner that, when both of the cords are not being operated in the take-up direction, the bobbin interlock means restricts rotation of the first bobbin and the second bobbin in the take-up direction, that, when the cords are operated in a pay-out direction by an operating force equal to or less than a preset value, the bobbin interlock means allows one of the bobbins to rotate in the pay-out direction and the other bobbin to rotate in the take-up direction in conjunction with the bobbin rotating in the pay-out direction, and that when the cords are operated in the pay-out direction by an operating force greater than the preset value, the bobbin interlock means releases the interlock between the first bobbin and the second bobbin to cause only the operated bobbin to rotate in the pay-out direction, a releasing means for releasing the restriction of the rotation of the first bobbin and the second bobbin in the take-up direction by the bobbin interlock means, and a connecting means for electrically connecting the two cords wound on the first bobbin and the second bobbin.

In this cord reel, in such a state that one of the cords is locked in the cord reel body including the bobbin and rotation of this bobbin in the take-up direction is thereby restricted, or a state that one of the cords is held by a hand and the like and movement of this cord in the take-up direction is thereby restricted, for example, when the other cord is operated in the pay-out direction by an operating force greater than a preset value against a biasing force of the bobbin biasing means, only the other bobbin is rotated in the pay-out direction by the bobbin interlock means, and therefore, only the other cord is paid out from the cord reel body. On the other hand, when both of the cords are operated in the pay-out direction by an operating force greater than the preset value against the biasing force of the bobbin biasing means, the interlock between both of the bobbins by the bobbin interlock means is released, and therefore, both of the bobbin are rotated in the pay-out direction, thereby resulting in that both of the cords are paid out from the cord reel body. When the pay-out operation of the cords is stopped in such a state that the cords have been paid out in this manner, both of the bobbins try to rotate in the take-up direction by the bobbin biasing means. However, the rotations are restricted by the bobbin interlock means, thereby making it possible that the cords are kept in the paid out position.

Further, when one of the cords is operated in the pay-out direction by an operating force equal to or less than the preset value in such a state that both of the cords have been paid out in this manner, one of the bobbins is rotated in the pay-out direction to thereby pay out one of the cords as well as the other bobbin is rotated in the take-up direction in conjunction with the bobbin rotating in the pay-out direction to thereby take up the other cord on the other bobbin. Accordingly, the lengths of both of the cords are adjusted at the same time in such a state that a total length of the cords is maintained substantially constant as if the cord reel body has moved along with one piece of cord having a fixed length. Namely, it is possible to adjust the position of the cord reel body in the paid out cords in such a state that the cords have been paid out to a certain length. Therefore, when the cord reel is applied to an earphone cord of a cellular phone or a portable audio device, for example, it becomes possible to adjust the position of the cord reel body without detracting from the appearance of clothes after the cords have been paid out to a length needed for a distance between a device such as a cellular phone, a portable audio device put in a pocket of clothes and an earphone worn in an ear, thereby making it possible to easily adjust the position of the cord reel body in a midway potion of the cords. In this regard, when taking up the paid out cords on the bobbins, the releasing means releases the restriction of rotation of both of the bobbins in the take-up direction by the bobbin interlock means to thereby take up the paid out cords by the biasing force of the bobbin biasing means.

In the cord reel, diameters of the first bobbin and the second bobbin can be set to be same and also to be different. For example, in an earphone cord, a length of the cord between the earphone and the cord reel body is often adjusted to be longer than a length of the cord between a jack and the cord reel body. Therefore, by setting the length of the former cord to be longer than the length of the latter cord and a diameter of a bobbin on which the former cord is taken up to be larger than a diameter of a bobbin on which the latter cord is taken up, it is possible to configure the cord reel body so as to be as compact as possible while ensuring a necessary length of the cord.

Further, it is a preferred embodiment that the cord wound on the first bobbin and the cord wound on the second bobbin are paid out to both sides of the cord reel body. Although both of the cords wound on the first bobbin and the second bobbin can be paid out to a same side of the cord reel body, when the cords are paid out to both of the sides of the cord reel body, it is possible to pay out the cords of an adequate length by holding each end portion of the two cords by each hand and then moving one hand to a disposing position of one of the cords as well as the other hand to a disposing position of the other cord with paying out the cords. For example, when the cord reel is applied to an earphone cord of a cellular phone or a portable audio device and the like, it is possible to easily pay out the cords of a necessary length by holding each end portion of the two cords by each hand and then moving one hand to a pocket of clothes in which a device such as a cellular phone and a portable audio device is to be put as well as the other hand to a position of an ear with paying out the cords. Further, a position of the cord reel body is adjusted without changing a total length of the paid out cords as described above in such a state that the cords of the necessary length have been paid out in this manner as described above.

The first bobbin and the second bobbin can be individually provided on two rotation shafts and can also be coaxially provided on one rotation shaft.

(1) A Case of Individually Providing the First Bobbin and the Second Bobbin on Two Rotation Shafts In this case, it is a preferred embodiment that the cord reel further includes a first rotation shaft for supporting the first bobbin and a second rotation shaft for supporting the second bobbin disposed so as to be parallel with respect to each other with a space between the first rotation shaft and the second rotation shaft, and further, the bobbin interlock means includes a rotation interlock means for interlockingly rotating the first bobbin and the second bobbin in opposite directions to each other with respect to the take-up direction and the pay-out direction and restricting rotation of the first bobbin and the second bobbin in the take-up direction and an interlock operating means for operating the rotation interlock means in such a manner that when the cords are operated in the pay-out direction by an operating force equal to or less than a preset value, the rotation interlock means interlocks the first bobbin and the second bobbin and that when the operating force is greater than the preset value, the rotation interlock means releases the interlock between the first bobbin and the second bobbin. In such a structure, it is possible to make the cord reel thinner than a cord reel in which the first bobbin and the second bobbin are coaxially provided. Further, since the bobbin biasing means can be individually disposed on each of the bobbins, it is possible to improve assemblability of the bobbin biasing means.

Further, it is a preferred embodiment that the rotation interlock means includes a first gear provided on an outer circumferential portion of the first bobbin, a second gear provided on an outer circumferential portion of the second bobbin, an interlocking gear detachably meshed with both of the first gear and the second gear and provided so as to be rotatable in an outside of a surface including rotational centers of the first gear and the second gear as well as rotatable on a supporting shaft parallel to both of the rotational centers, and further, the interlock operating means includes an interlock biasing means for continuously biasing the interlocking gear in a direction to be meshed with the first gear and the second gear wherein winding directions of the cords with respect to the first bobbin and the second bobbin are set to be opposite directions to each other so that the interlocking gear is moved in a direction to be separated from at least one of the first gear and the second gear by operating the cords in the pay-out direction, and furthermore, the releasing means includes an operating member for operating the interlocking gear in a direction to release the mesh between the interlocking gear and the first gear and between the interlocking gear and the second gear.

In the bobbin interlock means having such a structure, when the cords are operated in the pay-out direction by an operating force equal to or less than a preset value, the interlocking gear is meshed with each of the first gear and the second gear. In this state, when the operating force to the cords in the pay-out direction exceeds the preset value, the interlocking gear is moved in a direction to be separated from the gears of the operated bobbins, thereby releasing the mesh between the interlocking gear and the gears. On the other hand, since the cords are wound on the first bobbin and the second bobbin in opposite directions with respect to each other, when one of the cords is operated in the pay-out direction by an operating force equal to or less than the preset value, one of the bobbins is rotated in the pay-out direction to thereby pay out the cord from one of the bobbins as well as the other bobbin is rotated in the take-up direction in conjunction with the bobbin rotating in the pay-out direction to thereby take up the cord on the other bobbin. However, the operating force to the cord in the pay-out direction exceeds the preset value, the interlocking gear is separated from the gear of the operated bobbin and the mesh between the interlocking gear and the gear of the operated bobbin is thereby released. As a result, the interlock between the first gear and the second gear is released to thereby pay out the cord from the operated bobbin. Namely, in such a state that one of the cords is taken up to the end and one of the bobbins thereby cannot rotate further in the take-up direction, or a state that one of the cords is held by a hand to restrict movement of one of the bobbins in the take-up direction, when the other bobbin is operated in the pay-out direction by the operating force greater than the preset value, the interlock between both of the bobbins is released and the cord is thereby paid out only from the other bobbin. Further, also when both of the cords are operated in the pay-out direction by an operating force greater than the preset value, the cords are paid out from both of the bobbins. In this regard, it is preferred that gears are employed as the rotation interlock means because they have superior stability for transmitting a rotational force. However, it is also possible to employ any structure other than gears such as rollers provided with a rubber ring which can transmit a rotational force by means of friction on an outer circumferential surface thereof or rollers provided with concave portions and convex portions on an outer circumferential portion thereof so that the concave portions and the convex portions of one of the rollers are respectively fitted with the convex portions and the concave portions of the other roller, for example, as long as they can transmit a rotational force to each other.

Further, it is possible that the bobbin biasing means includes a first bobbin biasing means provided between the first rotation shaft and a casing of the cord reel for continuously biasing the first bobbin in the take-up direction of the cord and a second bobbin biasing means provided between the second rotation shaft and the casing of the cord reel for continuously biasing the second bobbin in the take-up direction of the cord. In such a structure, although the number of components such as a spiral spring as the bobbin biasing means is increased, since the first bobbin biasing means and the second bobbin biasing means are individually disposed on the first bobbin and the second bobbin respectively, it is possible to improve assemblability of the bobbin biasing means. It is also possible that a bobbin biasing means which is composed of a spiral spring having two spirals are utilized and both of end portions of the bobbin biasing means are respectively fixed on the first rotation shaft and the second rotation shaft to thereby continuously bias both of the bobbins in the take-up direction, for example, although the assemblability thereof is rather deteriorated.

(2) A Case of Coaxially Providing the First Bobbin and the Second Bobbin on One Rotation Shaft In this case, it is a preferred embodiment that the first bobbin and the second bobbin are provided on a same rotation shaft, and further, the cords are each wound on the first bobbin and the second bobbin in opposite directions with respect to each other, and furthermore, the bobbin interlock means includes a restricting means for restricting relative rotation of the first bobbin and the second bobbin in the take-up direction and an interlock operating means for interlockingly rotating the first bobbin and the second bobbin integrally when the cords are operated in the pay-out direction by an operating force equal to or less than a preset value and releasing the interlocked rotation of the first bobbin and the second bobbin when the operating force is greater than the preset value. In such a structure, although the cord reel is made to be thicker than a cord reel in which the first bobbin and the second bobbin are provided on different rotation shafts, it is possible to achieve the cord reel whose side surfaces have a compact size and also to reduce the number of components of the cord reel.

Further, it is a preferred embodiment that the bobbin interlock means includes a first bobbin provided on the rotation shaft so as to be relatively rotatable as well as movable in an axial direction with respect to the rotation shaft, a second bobbin provided on the rotation shaft so as to be relatively unrotatable as well as movable in the axial direction with respect to the rotation shaft, facing portions facing with each other in the axial direction and respectively formed on the first bobbin and the rotation shaft, and an interlock biasing means for continuously biasing both of the facing portions in a direction to be pressingly contacted with respect to each other, and further, the restricting means includes restricting portions provided on both of the facing portions for restricting relative rotation of the first bobbin and the second bobbin in the pay-out direction of the cords, and furthermore, the interlock operating means includes an interlock operating potion for interlockingly rotate the first bobbin and the second bobbin integrally when both of the bobbins are operated to relatively rotate in the pay-out direction by an operating force equal to or less than a preset value and releasing the interlocked rotation of both of the bobbins when the operating force is greater than the preset value, and moreover, the releasing means includes an operating portion formed on the rotation shaft for releasing an engagement of the restricting portions against a biasing force by the interlock biasing means.

Advantageous Effects of Invention

In the cord reel according to the present invention, as with a conventional cord reel provided with two bobbins, it is possible to individually pay out the two cords and also take up the two cords at the same time by an operation of the releasing means. In addition to this, when one of the cords is operated in the pay-out direction by an operating force equal to or less than a preset value in such a state that both of the cords have been paid out, one of the bobbins is rotated in the pay-out direction to thereby pay out one of the cords as well as the other bobbin is rotated in the take-up direction in conjunction with the bobbin rotating in the pay-out direction to thereby take up the other cord on the other bobbin. Accordingly, the lengths of both of the cords are adjusted at the same time in such a state that the total length of the cords is maintained substantially constant as if the cord reel body has moved along with one piece of cord having a fixed length. Therefore, it becomes possible to easily adjust the position of the cord reel body in a midway potion of the cord.

DESCRIPTION OF EMBODIMENTS

Hereinafter, preferred embodiments of the present invention will be described with reference to the drawings.

(First Embodiment)

As shown in FIGS. 1 to 8, a cord reel 1 of the first embodiment is provided with two cords 2 and a cord reel body 3 which can individually take up and pay out the two cords 2. In this embodiment, a description will be made with regard to such a case that the cord reel 1 of the present invention is applied to USB cables each having an end portion on which a USB terminal 2*a* is provided. However, the cord reel 1 of the present invention can also be applied to a cord other than the USB cable such as an earphone cord, a distribution cable for audio devices and the like in the same manner. In the present embodiment, "back and forth" and "right and left" directions are defined based on FIG. 2.

The cord reel body 3 is provided with a first bobbin 4 and a second bobbin 5 on which the cords 2 are wound in opposite directions to each other, bobbin biasing means 6 for continuously biasing both of the bobbins 4 and 5 in a take-up direction, a bobbin interlock means 7 for interlocking both of the bobbins 4 and 5 together, the bobbin interlock means 7 including a rotation interlock means 8 for rotationally interlocking both of the bobbins 4 and 5 in opposite directions to each other with respect to the take-up direction and the pay-out direction and also restricting rotation of both of the bobbins 4 and 5 in the take-up direction and a interlock operating means 9 for operating the rotation interlock means 8 so as to interlock both of the bobbins 4 and 5 together when the cords 2 are operated in a pay-out direction by an operating force equal to or less than a preset value and release the interlock between both of the bobbins 4 and 5 when the cords 2 are operated in the pay-out direction by an operating force greater than the preset value, a releasing means 10 for releasing the restriction of the rotation of both of the bobbins 4 and 5 in the take-up direction by the bobbin interlock means 7, and a connecting means 11 for electrically connecting the cords 2 wound on both of the bobbins 4 and 5 together.

A casing 12 of the cord reel body 3 is composed of a back-and-forth pair of dividable cases. Ejecting holes 12*a* for paying out the two cords 2 therefrom to the outside of the casing 12 are formed on each of lower end portions of right and left side wall portions of the casing 12. Further, a pair of supporting holes 12*b* for roratably supporting the right bobbin 4 and the left bobbin 5 are formed on a central portion in a height direction of a front wall portion and a central portion in a height direction of a back wall portion of the casing 12 with a space between the supporting holes 12*b* in a right and left direction. In this regard, although the two cords 2 are ejected to both sides of the cord reel body 3 in this embodiment, ejecting directions of the cords 2 can be arbitrarily set. For example, the two cords 2 can also be configured so as to be ejected to a same side of the cord reel body 3.

Next, a description will be made with regard to the first bobbin 4 and the second bobbin 5. Since both of the bobbins 4 and 5 are composed of the same components, the description will be made with regard to only the first bobbin 4. A structure of the second bobbin 5 can be described by changing the word "the first" of the first bobbin 4 into the word "the second" as well as the reference sign "4" into the reference sign "5".

The first bobbin 4 is provided with a front guide plate 4*b* including a first rotation shaft 4*a* which is integrally formed on a central portion thereof and a back guide plate 4*d* including a first gear 4*c* which is formed on an outer circumference thereof.

A tubular portion 4*e* which protrudes backward is integrally formed on the central portion of the front guide plate 4*b*. The cord 2 is wound on the tubular portion 4*e* between the front guide plate 4*b* and the back guide plate 4*d*. The first rotation shaft 4*a* which extends in a back and forth direction is integrally formed on a back wall portion of the tubular portion 4*e*. Further, a pair of locking portions 4*f* are also formed on the back wall portion of the tubular portion 4*e* so as to protrude backward. The front guide plate 4*b* is rotatably supported on the casing 12 by fitting a front end portion and a rear end portion of the first rotation shaft 4*a* into the supporting holes 12*b* of the front wall portion and the back wall portion of the casing 12, respectively.

A sleeve 4*g* which protrudes backward is formed on the central portion of the back guide plate 4*d*. The back guide plate 4*d* is coaxially supported with the front guide plate 4*b* by inserting a rear portion of the first rotation shaft 4*a* into the sleeve 4*g*. Further, a pair of engagement holes 4*h* are formed on the central portion of the back guide plate 4*d*. The back guide plate 4*d* is configured in such a manner that the locking portions 4*f* of the front guide plate 4*b* are fitted into each of the engagement holes 4*h* so that the back guide plate 4*d* integrally rotates with the front guide plate 4*b*.

A first bobbin biasing means 6*a* which is composed of a spiral spring and continuously biases the first bobbin 4 in the take-up direction and a second bobbin biasing means 6*b* which is composed of a spiral spring and biases the second bobbin 5 in the take-up direction are provided as the bobbin biasing means 6. The first bobbin biasing means 6*a* has one end portion which is inserted into the sleeve 4*g* and a slit 4*j* of the first rotation shaft 4*a* to be locked on the bobbin 4 and the other end portion which is locked on a locking pin 12*d* integrally formed on the casing 12. The second bobbin biasing means 6*b* has one end portion which is inserted into the sleeve 5*g* and a slit 5*j* of the second rotation shaft 5*a* to be locked on the bobbin 5 and the other end portion which is locked on a locking pin 12*e* integrally formed on the casing 12. Although the pair of bobbin biasing means 6*a* and 6*b* are provided so as to individually bias the first bobbin 4 and the second bobbin 5, respectively, in the take-up direction with respect to the casing 12 in the present embodiment, it is also possible to continuously bias both of the bobbins 4 and 5 in the take-up direction by means of one bobbin biasing means. In particular, a spiral spring having two spirals can be used in such a manner that both end portions of the spiral spring are each fixed to the first rotation shaft 4*a* and the second rotation shaft 5*a* to thereby continuously bias both of the bobbins 4 and 5 in the take-up direction.

Next, the bobbin interlock means 7 will be described. In the bobbin interlock means 7, the first gear 4*c* is formed around the outer circumferential portion of the back guide plate 4*d* of the first bobbin 4 and a second gear 5*c* is formed on an outer circumferential portion of a back guide plate 5*d* of the second bobbin 5. Further, an interlocking gear 15 which is detachably meshed with both of the gears 4*c* and 5*c* is provided between the first gear 4*c* and the second gear 5*c*. A generally U-shaped operating member 16 which includes an operating portion 16*a* disposed on an upper side of the casing 12 and leg portions 16*b* extending into the inside of the casing 12 from each of back and forth end portions of the operating portion 16*a*, is provided on a central portion in a right and left direction of the casing 12 so as to detachably support the interlocking gear 15 on both of the gears 4*c* and 5*c*. A supporting shaft 15*a* is integrally formed on the interlocking gear 15 so that the interlocking gear 15 is rotatably disposed and supported between a lower end portion of the front leg portion 16*b* and a lower end portion of the back leg portion 16*b* through the supporting shaft 15*a*. A right-and-left pair of guide wall portions 12*c* are formed on each of a central portion in a right and left direction of an inner surface of the front wall portion and a central portion in a right and left direction of an inner surface of the back wall portion of the casing 12 so as to protrude inward. The front and back leg portions 16*b* of the operating member 16 are guided in an up and down direction by the guide wall portions 12*c* and the operating member 16 is thereby movably guided in the up and down direction. A guide pin 16*c* which is inserted into an upper wall portion of the casing 12 is formed on the operating portion 16*a* so as to protrude downward. An interlock biasing means 17 which is composed of a coil spring and continuously biases the operating member 16 upward is fitted onto the exterior of the guide pin 16*c* between the operating member 16 and the upper wall portion of the casing 12. The interlocking gear 15 is continuously biased upward so as to be meshed with the first gear 4*c* and the second gear 5*c* through the operating member 16. The rereleasing means 10 is composed of the operating member 16, the interlock biasing means 17 and the like of the bobbin interlock means 7.

Next, the connecting means 11 will be described. In the connecting means 11, two pairs of an inner contact ring 18 and an outer contact ring 19 each of which is composed of a conductor are respectively provided on a front surface of the front guide plate 4*b* of the bobbin 4 and a front surface of the front guide plated 5*b* of the bobbin 5 in an in-and-out relationship with a space in a radial direction between the inner contact ring 18 and the outer contact ring 19. Insulation sheets 20 for preventing short circuit between the inner contact ring 18 and the outer contact ring 19 are provided between the inner contact ring 18 and the front guide plate 4*b* and between the inner contact ring 18 and the front guide plate 5*b*. In an inner surface side of the front wall portion of the casing 12, there are provided an inner connecting piece 21 which slidingly contacts with the inner contact rings 18 of the left and right bobbins 4 and 5 to electrically connect the inner contact rings 18 with respect to each other and an outer connecting piece 22 which slidingly contacts with the outer contact rings 19 of the left and right bobbins 4 and 5 to electrically connect the outer contact rings 19 with respect to each other. A base end portion of each of the cords 2 wound on the bobbins 4 and 5 is electrically connected to the inner connecting ring 18 and the outer connecting ring 19, respectively. The cords 2 wound on the left and right bobbins 4 and 5 are configured in such a manner that the electrical connection between both of the cords 2 can be maintained through both of the contact rings 18 and 19 and both of the connecting pieces 21 and 22 even if the left and right bobbins 4 and 5 rotate. Although the cords 2 are composed of two electrical cables in the present embodiment, the cord reel of the present invention can also be applied to the cords 2 composed of equal to or more than three electrical cables in the same manner by setting the number of contact rings and connecting pieces depending on the number of electrical cables. Further, although the contact rings 18 and 19 are directly fixed on the front surface of the front guide plate 4*b* and the front surface of the front guide plate 5*b* in the present embodiment, it is also a preferred embodiment that a circuit board or a circuit film on which the inner contact ring and the outer contact ring are formed by etching and the like is fixed on the front surfaces of the front guide plates 4*b* and 5*b*.

In the cord reel 1, when the cords 2 are not being operated in the pay-out direction, the interlocking gear 15 is meshed with the first gear 4*c* and the second gear 5*c*, as shown in FIG. 5. When the cords 2 are operated in the pay-out direction, the interlocking gear 15 tries to move in a direction to be separated from the first gear 4*c* and the second gear 5*c*, namely tries to move downward, against a biasing force of the interlock biasing means 17. However, even in such a state that the cords 2 are operated in the pay-out direction, when an operating force in the pay-out direction is equal to or less than a preset value which is a total of the biasing forces of the bobbin biasing means 6 and the interlock biasing means 17, the interlocking gear 15 is kept being meshed with the first gear 4*c* and the second gear 5*c*. On the other hand, when the operating force exceeds the preset value, the mesh between the interlocking gear 15 and the first gear 4*c* and the mesh between the interlocking gear 15 and the second gear 5*c* are released, thereby resulting in that the first gear 4*c* and the second gear 5*c* do not interlockingly rotate with respect to each other, as shown in FIG. 7. In this time, since the interlocking gear 15 and the first gear 4*c* as well as the interlocking gear 15 and the second gear 5*c* are biased in a direction to be contacted with each other by the interlock biasing means 17, gear teeth of the interlocking gear 15 and the first gear 4*c* as well as gear teeth of the interlocking gear 15 and the second gear 5*c* sequentially come into contact with clicking against each other so as to make relative rotation. When the operating force to the cords 2 in the pay-out direction is released, gear teeth located at the nearest position are meshed with each other so that the interlocking gear 15 and the first gear 4*c* as well as the interlocking gear 15 and the second gear 5*c* are meshed with each other again.

Further, when the cords 2 are not being operated in the pay-out direction, the first gear 4*c* and the second gear 5*c* are biased in the take-up direction by the bobbin biasing means 6 and thereby try to rotate in opposite directions to each other. In addition, since the interlocking gear 15 tries to move in a direction to be meshed with the first gear 4*c* and the second gear 5*c* (namely, upward) by forces in the rotating directions of the first gear 4*c* and the second gear 5*c*, the rotation of the first gear 4*c* and the second gear 5*c* is restricted through the interlocking gear 15. As shown in FIG. 6, when the operating member 16 is operated to be pushed downward, the interlocking gear 15 is completely separated from the first gear 4*c* and the second gear 5*c*, whereby releasing the interlocked rotation between the first gear 4*c* and the second gear 5*c*, and further, the first bobbin 4 and the second bobbin 5 are caused to rotate in the take-up direction by the biasing force of the bobbin biasing means 6.

Therefore, when the cord 2 is operated in the pay-out direction by an operating force greater than the preset value from a state shown in FIG. 8 (*a*), the interlocking gear 15 is moved in a direction to be separated from the first gear 4*c* and the second gear 5*c*, the mesh between the interlocking gear 15 and the first gear 4*c* and the mesh between the interlocking gear 15 and the second gear 5*c* are released, and the cord 2 is thereby paid out from the operated bobbin. Namely, in such a state that one of the cords 2 is taken up to the end and one of the bobbins thereby cannot rotate further in the take-up direction, or that one of the cords 2 is held by a hand so as to restrict movement of one of the bobbins in the take-up direction, when the other cord 2 is operated in the pay-out direction by the operating force greater than the preset value, the interlock between the bobbin 4 and the bobbin 5 is released and the cord 2 is thereby paid out only from the other bobbin. Further, also when both of the cords 2 are operated in the pay-out direction by the operating force greater than the preset value, the interlocking gear 15 is moved in a direction to be separated from the first gear 4*c* and the second gear 5*c*, the mesh between the interlocking gear 15 and the first gear 4*c* and the mesh between the interlocking gear 15 and the second gear 5*c* are released as shown in FIG. 7, and the cords 2 are thereby paid out to both sides of the cord reel body 3 as shown in FIG. 8 (*b*).

Further, when one of the cords 2 is operated in the pay-out direction by the operating force equal to or less than the preset value in such a state that both of the cords 2 have been paid out in this manner, the interlocking gear 15 is meshed with the first gear 4*c* and the second gear 5*c*, and the first gear 4*c* and the second gear 5*c* are thereby interlocked. In this time, when one of the bobbins rotates in the pay-out direction, the other bobbin rotates in the take-up direction. Accordingly, as shown in FIG. 8 (*c*), the lengths of both of the cords 2 are adjusted at the same time in such a state that a total length of the cords 2 is maintained substantially constant as if the cord reel body 3 has moved in a right and left direction along with one piece of cord 2 having a fixed length. Namely, it is possible to adjust the position of the cord reel body 3 in the paid out cords 2 in such a state that the cords 2 have been paid out to a certain length. Therefore, when the cord reel 1 is applied to an earphone cord of a cellular phone or a portable audio device, for example, it becomes possible to adjust the position of the cord reel body 3 without detracting from the appearance of clothes after the cords 2 have been paid out to a length needed for a distance between a device such as a cellular phone, a portable audio device put in a pocket of clothes and an earphone worn in an ear, thereby making it possible to easily adjust the position of the cord reel body 3 in a midway potion of the cords 2. When taking up the paid out cords 2 on the bobbins 4 and 5, the operating member 16 is operated to be pushed downward to completely separate the interlocking gear 15 from the first gear 4*c* and the second gear 5*c* as shown in FIG. 6, and then, the first bobbin 4 and the second bobbin 5 are rotated in the take-up direction by the bobbin biasing means 6 to thereby take up the cords 2 with respect to the cord reel body 3 as shown in FIG. 8 (*a*).

The number of the interlocking gear 15 can be arbitrarily set. However, when the number of the interlocking gear 15 is set to be an uneven number so that when one of the bobbins is operated to rotate in the pay-out direction, the other bobbin rotates in the take-up direction, the cords 2 should be wound on the left bobbin 4 and the right bobbin 5 in opposite directions with respect to each other, as shown in FIG. 2. On the other hand, when the number of the interlocking gear 15 is set to be an even number, the cords 2 should be wound on the left bobbin 4 and the right bobbin 5 in a same direction. Further, it is also possible to have such a structure that the first gear 4*c* and the second gear 5*c* are directly meshed with each other without providing the interlocking gear 15. Furthermore, it is preferred that gears are employed as the rotation interlock means 8 because they have superior stability for transmitting a rotational force. However, it is also possible to employ any structure other than gears such as rollers provided with a rubber ring which can transmit a rotational force by means of friction on an outer circumferential surface thereof or rollers provided with concave portions and convex portions on an outer circumferential portion thereof so that the concave portions and the convex portions of one of the rollers are respectively fitted with the convex portions and the concave portions of the other roller, for example, as long as they can transmit a rotational force to each other.

(Second Embodiment)

As shown in FIGS. 9 to 13, a cord reel 30 of the second embodiment is provided with two cords 31 and a cord reel body 32 which can individually take up and pay out the twocords 31. In this embodiment, the description will be made with regard to such a case that the cord reel 30 of the present invention is applied to a USB cables each having an end portion on which a USB terminal 31*a* is provided. However, the cord reel 30 of the present invention can also be applied to a cord other than the USB cable such as an earphone cord, a distribution cable for audio devices in the same manner. In the present embodiment, "back and forth" and "right and left" directions are defined based on FIG. 10.

The cord reel body 32 is provided with a first bobbin 33 and a second bobbin 34 on which the respective cords 31 are wound in opposite directions to each other, a rotation shaft 35 for coaxially supporting the first bobbin 33 and the second bobbin 34, a bobbin biasing means 36 for continuously biasing both of the bobbins 33 and 34 in the take-up direction, a bobbin interlock means 37 for interlocking both of the bobbins 33 and 34 together, the bobbin interlock means 37 including a restricting means 38 for restricting relative rotation of both of the bobbins 33 and 34 in the take-up direction and a interlock operating means 39 for interlockingly rotating both of the bobbins 33 and 34 integrally when the cords 31 are operated in the pay-out direction by an operating force equal to or less than a preset value and releasing the interlocked rotation between the bobbin 33 and the bobbin 34 when the cords 31 are operated in the pay-out direction by an operating force greater than the preset value, a releasing means 40 for releasing the restriction of the rotation of both of the bobbins 33 and 34 in the take-up direction by the bobbin interlock means 37, and a connecting means 41 for electrically connecting the cords 31 wound on the bobbins 33 and 34 together.

A casing 42 of the cord reel body 32 is composed of a back-and-forth pair of dividable cases. Ejecting holes 42*a* for paying out the two cords 31 to the outside of the casing 42 are formed on each of left and right portions of a circumferential wall portion of the casing 42. Further, an up-and-down pair of supporting holes 42*b* for roratably supporting the rotation shaft 35 are respectively formed on a central portion of an upper wall portion and a central portion of a lower wall portion of the casing 42. Although the two cords 31 are ejected to both sides of the cord reel body 32 in this embodiment, ejecting directions of the cords 31 can be arbitrarily set. For example, the two cords 31 can also be configured so as to be ejected to a same side of the cord reel body 32.

The first bobbin 33 is provided with a sleeve 33*a*, an upper guide plate 33*b* and a lower guide plate 33*c* each of which has a discoid shape and extends outward from an upper end portion and a lower end portion of the sleeve 33*a*, respectively, and a tubular housing portion 33*d* which has a cylindrical shape and extends upward from an outer circumferential portion of the upper guide plate 33*b*. The first bobbin 33 is composed of an integrally molded article which is made of a synthetic resin material and the like. Further, the cord 31 is wound on the sleeve 33*a* between the upper guide plate 33*b* and the lower guide plate 33*c*. It is also possible to configure the first bobbin 33 so as to be divided into two parts, one of the parts being composed of the upper guide plate 33*b* and the tubular housing portion 33*d* and the other part being composed of the lower guide plate 33*c* and the sleeve 33*a*, join the two parts together by means of an adhesive or concave-convex fitting so as to prevent relative rotation therebetween, and then dispose the joined parts onto the rotation shaft 35.

The second bobbin 34 is provided with a sleeve 34*a* and an upper guide plate 34*b* which extends outward from an upper end portion of the sleeve 34*a*. The second bobbin 34 is composed of an integrally molded article which is made of a synthetic resin material and the like. Further, the cord 31 is wound on the sleeve 34*a* between the upper guide plate 34*b* and a lower wall portion of the casing 42 in a direction opposite to the winding direction of the cord 31 wound on the first bobbin 33. It is also possible for the second bobbin 34 to have such a structure that discoid guide plates are each provided on an upper end portion and a lower end portion of the sleeve 34*a* and the cord 31 is wound on the sleeve 34*a* between the upper guide plate and the lower guide plate in the same manner as the first bobbin 33.

The bobbin biasing means 36 is composed of a spiral spring and housed inside the tubular housing portion 33*d* of the first bobbin 33. The bobbin biasing means 36 has one end portion at a side of a spiral center which is inserted into and fixed on a slit 35*a* formed on the rotation shaft 35 and the other end portion which is hooked and fixed on a notched portion 33*e* formed on the tubular housing portion 33*d*. Both of the bobbins 33 and 34 are continuously biased in the take-up direction, by the bobbin biasing means 36 as described later.

Next, the bobbin interlock means 37 will be described. In the bobbin interlock means 37, the first bobbin 33 and the second bobbin 34 are coaxially disposed one above the other on the rotation shaft 35. Further, the first bobbin 33 is provided on the rotation shaft 35 so as to be relatively rotatable and also movable in an axial direction with respect to the rotation shaft 35. A circular flange portion 35*b* which extends outward is integrally formed on a midway portion of the rotation shaft 35. On a facing portion of the upper guide plate 33*b* of the first bobbin 33 which faces the flange portion 35*b* and a facing portion of the flange portion 35*b* which faces the upper guide plate 33*b* of the first bobbin 33, there are respectively provided restricting portions 33*j* and 35*j* as the restricting means 38 for restricting relative rotation of the bobbin 33 and the bobbin 34 with respect to the take-up direction of the cords 31 and also interlock operating portions 33*k* and 35*k* as the interlock operating means 39 for interlockingly rotating both of the bobbins 33 and 34 integrally when the bobbin 33 and the bobbin 34 are operated to relatively rotate with each other in the pay-out direction by an operating force equal to or less than a preset value and, releasing the interlocked rotation between the bobbin 33 and the bobbin 34 when the operating force is greater than the preset value. Circular flat surfaces 33*f* and 35*f* are respectively formed on a lower surface of the upper guide plate 33*b* of the first bobbin 33 which faces the flange portion 35*b* and an upper surface of the flange portion 35*b* in a direction perpendicular to a shaft center. Two convex portions 33*g* are formed on the flat surface 33*f* so as to protrude therefrom with a space of 180° between the two convex portions 33*g* in a circumferential direction of the flat surface 33*f*. Further, two convex portions 35*g* are formed on the flat surface 35*f* so as to protrude therefrom with a space of 180° between the two convex portions 35*g* in a circumferential direction of the flat surface 35*f*. The restricting portion 33*j* and the interlock operating portion 33*k* are formed on each of lateral portions in a circumferential direction of the convex portion 33*g*. Further, the restricting portion 35*j* and the interlock operating portion 35*k* are formed on each of lateral portions in a circumferential direction of the convex portion 35*g*. Each of the restricting portions 33*j* and 35*j* is composed of a surface in a radial direction including the shaft center of the rotation shaft 35. Further, each of the interlock operating portions 33*k* and 35*k* is composed of an inclined surface which is inclined at a certain angle θ in one direction with respect to the flat surfaces 33*f* and 35*f*, respectively.

A locking convex portion 35*c* having a cross shape is provided on the rotation shaft 35 so as to continue from an underneath of the flange portion 35*b*. Further, a locking hole 34*c* having a cross shape into which the locking convex portion 35*c* of the rotation shaft 35 is inserted is formed on an inner surface of the sleeve 34*a* of the second bobbin 34. The second bobbin 34 is supported on the rotation shaft 35 so as to be relatively unrotatable and also movable in the axial direction with respect to the rotation shaft 35 by an engagement between the locking hole 34*c* and the locking convex portion 35*c*. A lower shaft portion 35*d* which is inserted into a supporting hole 42*b* formed on a lower wall portion of the casing 42 is formed on a lower portion of the rotation shaft 35. An interlock biasing means 43 which is composed of a compression coil spring and continuously biases the rotation shaft 35 upward is provided on the lower shaft portion 35*d* between the locking convex portion 35*c* of the rotation shaft 35 and the lower wall portion of the casing 42. The flange portion 35*b* of the rotation shaft 35 and the upper guide plate 33*b* of the first bobbin 33 are configured so as to be pressingly contacted with each other by a biasing force of the interlock biasing means 43.

An operating cap 44 is fitted onto an inside of a supporting hole 42*b* formed on an upper wall portion of the casing 42 so as to be movable in an up and down direction. Further, a flange portion 44*a* which comes into contact with a rim portion of the supporting hole 42*b* from an underneath thereof is formed on a lower end portion of the operating cap 44. An upper end portion of the rotation shaft 35 is roratably fitted onto an inside of the operating cap 44. Further, the operating cap 44 is biased by the interlock biasing means 43 through the rotation shaft 35 in such a manner that the flange portion 44*a* comes into contact with the rim portion of the supporting hole 42*b* and a certain amount of an upper portion of the operating cap 44 thereby protrudes upward. The releasing means 40 is composed of the operating cap 44, the interlock biasing means 43 and the like. The releasing means 40 is configured in such a manner that, when the rotation shaft 35 is operated to be pushed downward together with the operating cap 44 against a biasing force of the interlock biasing means 43, the flange portion 35*b* of the rotation shaft 35 is separated from the upper guide plate 33*b* of the first bobbin 33, thereby releasing the interlock between the rotation shaft 35 and the first bobbin 33.

Next, the connecting means 41 will be described. In the connecting means 41, an inner contact ring 45 and an outer contact ring 46 each of which is composed of a conductor are provided on a lower surface of the lower guide plate 33*c* of the first bobbin 33 in an in-and-out relationship with a space in a radial direction between the inner contact ring 45 and the outer contact ring 46. An insulation sheet 47 for preventing short circuit between the inner contact ring 45 and the outer contact ring 46 is provided between the inner contact ring 45 and the lower guide plate 33*c*. On the upper guide plate 34*b* of the second bobbin 34, there are provided an inner connecting piece 48 which slidingly contacts with the inner contact ring 45 and an outer connecting piece 49 which slidingly contacts with the outer contact ring 46. A base end portion of the cord 31 wound on the first bobbin 33 is electrically connected to the inner contact ring 45 and the outer contact ring 46 and, a base end portion of the cord 31 wound on the second bobbin 34 is electrically connected to the inner connecting piece 48 and the outer connecting piece 49. The cords 31 each wound on the first bobbin 33 and the second bobbin 34 are configured in such a manner that the electrical connection between both of the cords 31 can be maintained through both of the contact rings 45 and 46 and both of the connecting pieces 48 and 49 even if the upper bobbin 33 and lower bobbin 34 relatively rotate with respect to each other. Although the cords 31 are composed of two electrical cables in the present embodiment, the cord reel of the present invention can also be applied to the cords 31 composed of equal to or more than three electrical cables in the same manner by setting the number of contact rings and connecting pieces depending on the number of electrical cables. Further, although the contact rings 45 and 46 are directly fixed on the lower surface of the lower guide plate 33*c* in the present embodiment, it is also a preferred embodiment that a circuit board or a circuit film on which the inner and the outer contact rings are formed by etching and the like is fixed on the lower surface of the lower guide plate 33*c*.

In the cord reel 30, when the cords 31 are not being operated in the pay-out direction, each of the restricting portions 35*j* of the rotation shaft 35 and each of the restricting portions 33*j* of the first bobbin 33 are engaged with each other by the biasing force of the bobbin biasing means 36 in the take-up direction, thereby restricting relative rotation of the first bobbin 33 in the take-up direction with respect to the rotation shaft 35 as well as relative rotation of the second bobbin 34 which is provided on the rotation shaft 35 so as to be relatively unrotatable, with respect to the rotation shaft 35 in the take-up direction with respect to the first bobbin 33, as shown in FIG. 12 (*a*).

On the other hand, when at least one of the cords 31 is operated in the pay-out direction against the biasing force of the bobbin biasing means 36, one of the first bobbin 33 and the second bobbin 34 (the rotation shaft 35) tries to move in the pay-out direction as shown in FIG. 12 (*a*). When an operating force in this time is equal to or less than a preset value which is a total of the biasing forces of the bobbin biasing means 36 and the interlock biasing means 43, both of the bobbins 33 and 34 relatively rotate with each other to some degree in the pay-out direction as shown in FIGS. 12 (*b*) and (*c*). However, further relative rotation of the bobbins 33 and 34 is restricted by the interlock operating portions 33*k* and 35*k*, and the first bobbin 33 and the second bobbin 34 thereby rotate in a same direction in a mass. Namely, when one of the cords 31 is paid out from one of the bobbins, the other cord 31 is taken up on the other bobbin. However, when the operating force exceeds the preset value, the interlock operating portions 35*k* of the rotation shaft 35 sequentially climb over the interlock operating portions 33*k* of the first bobbin 33 as shown in FIG. 12 (*d*), thereby making it possible to pay out the cord 31 only from the operated bobbin. When the operating force to the cord 31 in the pay-out direction is reduced, the restricting portions 33*j* and the restricting portions 35*j* located at the nearest position are engaged with each other so as to mass both of the bobbins 33 and 34, and therefore, the cord 31 is kept in the paid-out state.

Accordingly, when the cord 31 is operated in the pay-out direction by an operating force greater than the preset value from a state shown in FIG. 13 (*a*), the interlock operating portions 35*k* of the rotation shaft 35 and the interlock operating portions 33*k* of the first bobbin 33 climb over with respect to each other as shown in FIG. 12 (*d*), thereby resulting in that the first bobbin 33 and the second bobbin 34 become relatively rotatable in the pay-out direction, and accordingly, the cord 31 is paid out from the operated bobbin. Namely, in such a state that one of the cords 31 is taken up to the end and one of the bobbins thereby cannot rotate further in the take-up direction, or a state that one of the cords 31 is held by a hand so as to restrict movement of one of the bobbins in the take-up direction, when the other cord 31 is operated in the pay-out direction by the operating force greater than the preset value, the interlock between the bobbin 33 and the bobbin 34 is released, and the cord 31 is thereby paid out only from the other bobbin. Further, also when both of the cords 31 are operated in the pay-out direction by the operating force greater than the preset value, the interlock operating portions 35*k* of the rotation shaft 35 and the interlock operating portions 33*k* of the first bobbin 33 climb over with respect to each other as shown in FIG. 12 (*d*), thereby resulting in that the first bobbin 33 and the second bobbin 34 become relatively rotatable in the pay-out direction, and accordingly, the cords 31 are paid out to both sides of the cord reel body 32 as shown in FIG. 13 (*b*).

Further, when one of the cords 31 is operated in the pay-out direction by an operating force equal to or less than the preset value in such a state that both of the cords 31 have been paid out in this manner, the first bobbin 33 and the second bobbin 34 rotate in a mass. In this time, when one of the bobbins rotates in the pay-out direction, the other bobbin rotates in the take-up direction. Accordingly, as shown in FIG. 13(*c*), the lengths of both of the cords 31 are adjusted at the same time in such a state that a total length of the cords 31 is maintained substantially constant as if the cord reel body 32 has moved in a right and left direction along with one piece of cord 31 having a fixed length. Namely, it is possible to adjust the position of the cord reel body 32 in the paid out cords 31 in such a state that the cords 31 have been paid out to a certain length. Therefore, when the cord reel 31 is applied to an earphone cord 31 of a cellular phone or a portable audio device or the like, for example, it becomes possible to adjust the position of the cord reel body 32 without detracting from the appearance of clothes after the cords 31 have been paid out to a length needed for a distance between a device such as a cellular phone, a portable audio device put in a pocket of clothes and an earphone worn in an ear, thereby making it possible to easily adjust the position of the cord reel body 32 in a midway potion of the cord 31. When taking up the paid out cords 31 on the bobbins, the operating cap 44 is operated to be pushed downward to separate the restricting portion 33*j* from the restricting portion 35*j* as well as the interlock operating portion 33*k* from the interlock operating portion 35*k* as shown in FIG. 12 (*e*), and then, the first bobbin 33 and the second bobbin 34 are rotated in the take-up direction by the bobbin biasing means 36 to thereby take up the cords 31 with respect to the cord reel body 32 as shown in FIG. 13 (*a*).

Next, a description will be made with regard to another embodiment in which the structures of the bobbin interlock means 37 and the releasing means 40 of the cord reel 30 of the above-described second embodiment are partially modified and both of the bobbin interlock means 37 and the releasing means 40 are provided beside bobbins so as to be separated from the rotation shaft 35. The same members as those in the cord reel 30 of the above-described second embodiment are indicated by the same reference signs and a detailed description thereof will be omitted.

(1) In a cord reel 30A shown in FIGS. 14 to 17, a first bobbin 33A and a second bobbin 34A are coaxially provided on a rotation shaft 35A, and further, the cords 31 are wound on the first bobbin 33A and the second bobbin 34A in opposite directions with respect to each other in the same manner as in the above-described second embodiment. However, unlike the above-described second embodiment, the bobbin interlock means 37 and the releasing means 40 are not provided between the rotation shaft 35A and both of the bobbins 33A and 34A, namely the first bobbin 33A and the second bobbin 34A are simply supported on the rotation shaft 35A so as to be relatively rotatable with respect to the rotation shaft 35A.

Next, a description will be made with regard to a bobbin interlock means 50 of the cord reel 30A. In the bobbin interlock means 50 of the cord reel 30A, a first gear 51 is formed on an outer circumferential portion of an upper guide plate 33*b* of the first bobbin 33A and a second gear 52 is formed on an outer circumferential portion of an upper guide plate 34*b* of the second bobbin 34A. Beside both of the bobbins 33A and 34A, a shaft member 53 is rotatably provided between an upper wall portion and a lower wall portion of a casing 42A. A first interlocking gear 54 which is meshed with the first gear 51 is provided on a midway portion of the shaft member 53 so as to be relatively rotatable and movable in an up and down direction with respect to the shaft member 53. Further, a second interlocking gear 55 which is meshed with the second gear 52 is integrally formed on a lower portion of the shaft member 53.

On a facing portion of the first interlocking gear 54 which faces the second interlocking gear 55 and a facing portion of the second interlocking gear 55 which faces the first interlocking gear 54, there are provided a restricting means 56 for restricting relative rotation of the bobbins 33A and 34A in the take-up direction and an interlock operating means 57 for interlockingly rotating both of the bobbins 33A and 34A integrally when the cords 31 are operated in the pay-out direction by an operating force equal to or less than a preset value and releasing the interlocked rotation between the bobbin 33A and the bobbin 34A when the operating force is greater than the preset value. The restricting means 56 is provided with restricting portions 54*j* and 55*j* having the same structure as that of the restricting portions 33*j* and 35*j* of the above-described second embodiment and the interlock operating means 57 is provided with interlock operating portions 54*k* and 55*k* having the same structure as that of the interlock operating portions 33*k* and 35*k* of the above-described second embodiment. In particular, circular flat surfaces 54*f* are formed on the facing portion of the interlocking gears 54 and the facing portion of the interlocking gear 55 in a direction perpendicular to a shaft center. Two convex portions 54*g* and 55*g* are formed on the flat surface 54*f* so as to protrude therefrom with a space of 180° between the two convex portions 54*g* in a circumferential direction of the flat surface 54*f*. The restricting means 56 is composed of the restricting portions 54*j* and 55*j* respectively formed on one of end portions in the circumferential direction of the convex portion 54*g* and one of end portions in the circumferential direction of the convex portion 55*g*. Further, the interlock operating means 57 is composed of the interlock operating portions 54*k* and 55*k* respectively formed on the other end portion in the circumferential direction of the convex portion 54*g* and the other end portion in the circumferential direction of the convex portion 55*g*.

The shaft member 53 is provided so as to be movable within a certain distance in an up and down direction. An operating portion 53*a* as a releasing means is integrally formed on a lower end portion of the shaft member 53 so as to protrude downward. An interlock biasing means 58 which is composed of a compression coil spring and biases the shaft member 53 downward through the first interlocking gear 54 is provided on the exterior of an upper portion of the shaft member 53 between the first gear 51 and an upper wall portion of the casing 42A. The facing portion of the first interlocking gear 54 and the facing portion of the second interlocking gear 55 are pressingly contacted with each other by the interlock biasing means 58. When the operating portion 53*a* is operated to be pushed upward against a biasing force of the interlock biasing means 58, the second gear 52 is moved upward together with the shaft member 53, thereby releasing the mesh between the second gear 52 and the second interlocking gear 55.

In the cord reel 30A, when the cords 31 are not being operated in the pay-out direction, each of the restricting portions 54*j* of the first interlocking gear 54 and each of the restricting portions 55*j* of the first interlocking gear 55 are engaged with each other by a biasing force of the bobbin biasing means 36 in the take-up direction, thereby restricting relative rotation of the first bobbin 33A which is meshed with the first interlocking gear 54 and the second bobbin 34A which is meshed with the second interlocking gear 55 in the take-up direction, as shown in FIG. 15.

On the other hand, when at least one of the cords 31 is operated in the pay-out direction against the biasing force of the bobbin biasing means 36, at least one of the first bobbin 33A and the second bobbin 34A tries to move in the pay-out direction. When an operating force in this time is equal to or less than a preset value which is a total of the biasing forces of the bobbin biasing means 36 and the interlock biasing means 58, the operated bobbin rotates to some degree in the pay-out direction. However, further relative rotation of the operated bobbin is restricted by the restricting portions 54*j* and 55*j*, and the first bobbin 33A and the second bobbin 34A thereby rotate in a same direction in a mass. In this regard, since the cords 31 are wound on both of the bobbins 33A and 34A in opposite directions with respect to each other, when one of the cords 31 is paid out from one of the bobbins, the other cord 31 is taken up on the other bobbin. However, when the operating force exceeds the preset value, the interlock operating portions 54*k* of the first interlocking gear 54 sequentially climb over the interlock operating portions 55*k* of the second interlocking gear 55 as shown in FIG. 16, thereby making it possible to pay out the cord 31 only from the operated bobbin. When the operating force to the cord 31 in the pay-out direction is reduced, the restricting portions 54*j* and the restricting portions 55*j* located at the nearest position are engaged with each other so as to mass both of the bobbins 33A and 34A, and therefore, the cord 31 is kept in the paid-out state.

In this manner, in the cord reel 30A, when the cord 31 are operated in the pay-out direction by an operating force greater than the preset value, the cords 31 are paid out from the operated bobbins, as with the second embodiment. Further, when one of the cords 31 is operated in the pay-out direction by an operating force equal to or less than the preset value in such a state that the cords 31 have been paid out, the first bobbin 33A and the second bobbin 34A rotate in a mass. In this time, when one of the bobbins rotates in the pay-out direction, the other bobbin rotates in the take-up direction. Accordingly, the lengths of both of the cords 31 are adjusted at the same time in such a state that a total length of the cords 31 is maintained substantially constant as if the cord reel body 32A is moved in a right and left direction along with one piece of cord 31 having a fixed length. Further, when taking up the paid out cords 31 on the bobbins, the operating portion 53*a* is operated to be pushed upward to separate the restricting portion 54*j* from the restricting portion 55*j* as well as the interlock operating portion 54*k* from the interlock operating portion 55*k* as shown in FIG. 17, and then, the first bobbin 33A and the second bobbin 34A are rotated in the take-up direction by the bobbin biasing means 36 to thereby take up the cords 31 with respect to the cord reel body 32A.

(2) In a cord reel 30B shown in FIGS. 18 to 20, a first bobbin 33B and a second bobbin 34B are coaxially provided on a rotation shaft 35B, and further, the cords 31 are wound on the first bobbin 33B and the second bobbin 34B in opposite directions with respect to each other in the same manner as in the above-described second embodiment. However, unlike the above-described second embodiment, the bobbin interlock means 37 and the releasing means 40 are not provided between the rotation shaft 35B and both of the bobbins 33B and 34B, namely the first bobbing 33B and the second bobbin 34B are simply supported on the rotation shaft 35B so as to be relatively rotatable with respect to the rotation shaft 35B.

Next, a description will be made with regard to a bobbin interlock means 60 of the cord reel 30B. In the bobbin interlock means 60 of the cord reel 30B, a first gear 61 is formed on an outer circumferential portion of a lower guide plate 33*c* of the first bobbin 33B and a second gear 62 is formed on an outer circumferential portion of an upper guide plate 34*b* of the second bobbin 34B. Beside both of the bobbins 33B and 34B, a pivot shaft 63 is provided between an upper wall potion and a lower wall portion of a casing 42B so as to be parallel with respect to the rotation shaft 35B. An operating lever 64 which extends in both right and left directions is turnably supported on the pivot shaft 63. An operating portion 64*a* as a releasing means which protrudes to the outside of the casing 42B is formed on a right end portion of the operating lever 64. Further, an interlock biasing means 65 which is composed of a compression coil spring is provided between a left end portion of the operating lever 64 and a sidewall of the casing 42B. A shaft member 66 is rotatably provided on the operating lever 64 between the interlock biasing means 65 and the pivot shaft 63 so as to be parallel with respect to the rotation shaft 35B. An interlocking gear 67 which is meshed with the first gear 61 and the second gear 62 is integrally provided on a midway portion of the shaft member 66. The interlocking gear 67 is continuously biased by the interlock biasing means 65 in a direction to be meshed with the first gear 61 and the second gear 62. Further, the operating portion 64*a* is continuously biased in a direction to protrude to the outside of the casing 42B. The operating lever 64 is turned as shown in FIG. 19 by pushing the operating portion 64*a* to thereby separate the interlocking gear 67 from the first gear 61 and the second gear 62.

In the cord reel 30B, when the cords 31 are not being operated in the pay-out direction, the first bobbin 33B and the second bobbin 34B try to rotate in opposite directions with respect to each other by a biasing force of the bobbin biasing means 36 in the take-up direction as shown in FIG. 18. However, since the first gear 61 and the second gear 62 are meshed with the interlocking gear 67, relative rotation of both of the bobbins 33B and 34B in opposite directions is restricted.

On the other hand, when at least one of the cords 31 is operated in the pay-out direction against the biasing force of the bobbin biasing means 36, at least one of the first bobbin 33B and the second bobbin 34B tries to move in the pay-out direction, and further, such a force that gear teeth of the interlocking gear 67 try to be disengaged outwardly from gear teeth of the first gear 61 and gear teeth of the second gear 62 acts on the interlocking gear 67 in meshed portions between the interlocking gear 67 and the first gear 61 and between the interlocking gear 67 and the second gear 62. However, when the operating force to the cord 31 in this time is equal to or less than a preset value which is a total of the biasing forces of the bobbin biasing means 36 and the interlock biasing means 65, the first gear 61 and the interlocking gear 67 as well as the second gear 62 and the interlocking gear 67 are kept in the meshed state and relative rotation of both of the bobbins 33B and 34B is thereby restricted, and therefore, the first bobbin 33B and the second bobbin 34B rotate in a same direction in a mass. In this regard, since the cords 31 are wound on both of the bobbins 33B and 34B in opposite directions with respect to each other, when one of the cords 31 is paid out from one of the bobbins, the other cord 31 is taken up on the other bobbin. However, when the operating force exceeds the preset value, the gear teeth of the interlocking gear 67 are disengaged outwardly from the gear teeth of the first gear 61 and the gear teeth of the second gear 62, and the gear teeth of the interlocking gear 67 then sequentially climb over the gear teeth of the first gear 61 and the gear teeth of the second gear 62 as shown in FIG. 19, thereby making it possible to pay out the cord 31 only from the operated bobbin. When the operating force to the cord 31 in the pay-out direction is reduced, the gear teeth of the interlocking gear 67 are engaged with the gear teeth of the first gear 61 and the gear teeth of the second gear 62 located at the nearest position so as to mass both of the bobbins 33B and 34B, and therefore, the cord 31 is kept in the paid-out state.

In this manner, in the cord reel 30B, when the cords 31 are operated in the pay-out direction by an operating force greater than the preset value, the cords 31 are paid out from the operated bobbins, as with the second embodiment. Further, when one of the cords 31 is operated in the pay-out direction by an operating force equal to or less than the preset value in such a state that the cords 31 have been paid out, the first bobbin 33B and the second bobbin 34B rotate in a mass. In this time, when one of the bobbins rotates in the pay-out direction, the other bobbin rotates in the take-up direction. Accordingly, the lengths of both of the cords 31 are adjusted at the same time in such a state that a total length of the cords 31 is maintained substantially constant as if the cord reel body 32B has moved in a right and left direction along with one piece of cord 31 having a fixed length. Further, when taking up the paid out cords 31 on the bobbins, the operating portion 64*a* is operated to be pushed to separate the interlocking gear 67 from the first gear 61 and the second gear 62 as shown in FIG. 19, and then, the first bobbin 33B and the second bobbin 34B are rotated in the take-up direction by the bobbin biasing means 36 to thereby take up the cords 31 with respect to the cord reel body 32B.

(3) Although the bobbin biasing means and the cords are disposed on different positions in the axial direction of the rotation shaft in the above-described first and second embodiments, it is also possible that the bobbin biasing means is arrange at a side of the central portion of the bobbin and the cord is arranged at a side of the outer circumference of the bobbin so that the cord reel is made to be thin-walled in the axial direction of the rotation shaft. For example, as in a cord reel 30C shown in FIG. 21, it is also possible to have such a structure that, instead of the first bobbin 33, a first bobbin 33C including a lower guide plate 33*c* and an inner-and-outer pair of partition portions 70 and 71 having a generally cylindrical shape which are formed on a midway portion in a radial direction of the lower guide plate 33*c* so as to protrude upward is used without providing the sleeve 33*a*, the upper guide plate 33*b* and the tubular housing portion 33*d*, a bobbin biasing means 36 which is composed of a spiral spring is housed inside the inner partition portion 70, one end portion at a central side of the bobbin biasing means 36 is fixed to a rotation shaft 35C as well as the other end potion at an outer circumferential side of the bobbin biasing means 36 to the partition portion 70, a cord 31 is wound on the outer partition portion 71, and inner and outer contact rings 45 and 46 of a connecting means 41 are electrically connected to the cord 31 between the partition portion 70 and the partition portion 71. In this case, the cord 31 wound on the first bobbin 33C is shorter than a cord 31 wound on a second bobbin 34. Therefore, when the cord reel 30C is applied to an earphone and the like, it is possible to make a cord reel body 32C smaller in an axial direction of the rotation shaft 35C while ensuring a necessary length of the cord by winding a cord at a jack side on the first bobbin 33C and a cord at an earphone side on the second bobbin 34.

(4) In the cord reel 30 of the above-described second embodiment and the cord reel 30C, the lower end portion of the interlock biasing means 43 is directly received by the casing 42. However, as in a cord reel body 32D of a cord reel 30D shown in FIG. 22, it is also possible that an inner sleeve 34*d* which is fitted onto the exterior of a flange portion 35*b* of a rotation shaft 35C is integrally formed on a second bobbin 34 inside a sleeve 34*a* of the second bobbin 34, a spring receiving portion 34*e* which extends inward so as to be fitted onto the exterior of a lower shaft portion 35*d* is formed on a lower end portion of the inner sleeve 34*d*, an interlock biasing means 43 which biases the shaft member 35C upward is provided between the flange portion 35*b* and the spring receiving portion 34*e* so as to be fitted onto the exterior of the lower shaft portion 35*d*, and a lower end portion of the interlock biasing means 43 is received by the casing 42 through the spring receiving portion 34*e*. This structure is preferred because it is possible to prevent the lower end portion of the interlock biasing means 43 from directly sliding on the casing 42 and receive a biasing force of the interlock biasing means 43 by the casing 42 through the spring receiving portion 34*e*, thereby making rotation of the shaft member 35C and the second bobbin 34 smoother in this case.

Although the cord reel is configured so as to transmit the rotational force by means of the gears in the above-described other embodiments, it is also possible to employ any structure other than gears such as rollers provided with a rubber ring which can transmit a rotational force by means of friction on an outer circumferential surface thereof or rollers provided with concave portions and convex portions on an outer circumferential portion thereof so that the concave portions and the convex portions of one of the rollers are respectively fitted with the convex portions and the concave portions of the other roller, for example, as long as they can transmit a rotational force to each other. Further, although the cords 31 are composed of two electrical cables in the above-described another embodiment, the cord reel of the present invention can also be applied to the cords 31 composed of equal to or more than three electrical cables in the same manner by setting the number of contact rings and connecting pieces depending on the number of electrical cables. Furthermore, although the inner and outer contact rings 45 and 46 are directly fixed on the lower surface of the lower guide plate 33*c*, it is also a preferred embodiment that a circuit board or a circuit film on which the inner and outer contact rings 45 and 46 are formed by etching and the like is fixed onto the lower surface of the lower guide plate 33*c*.

REFERENCE SIGNS LIST

Figure 1:
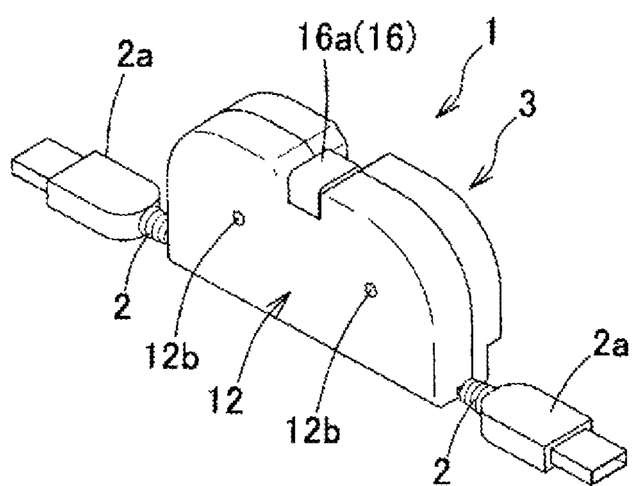
FIG. 1 is a perspective view illustrating a cord reel according to a first embodiment.
Figure 2:
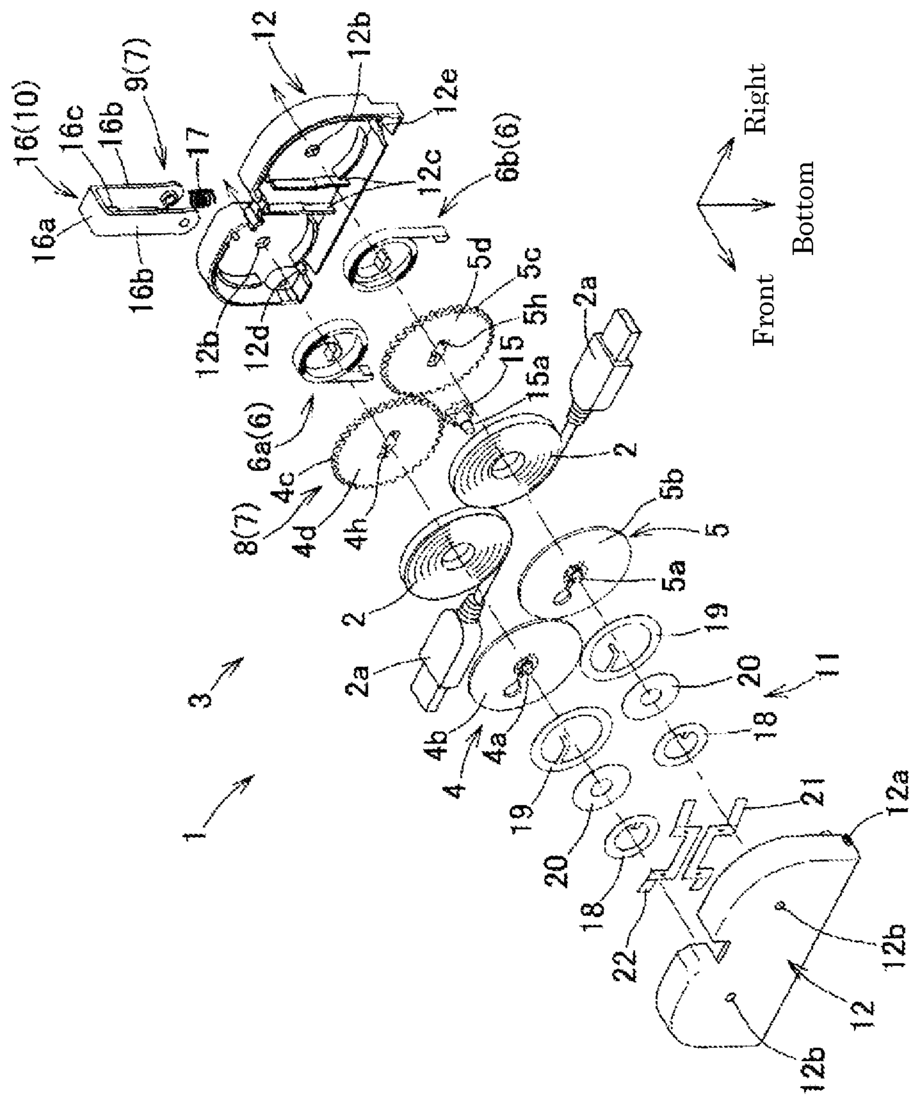
FIG. 2 is an exploded perspective view illustrating the cord reel according to the first embodiment.
Figure 3:
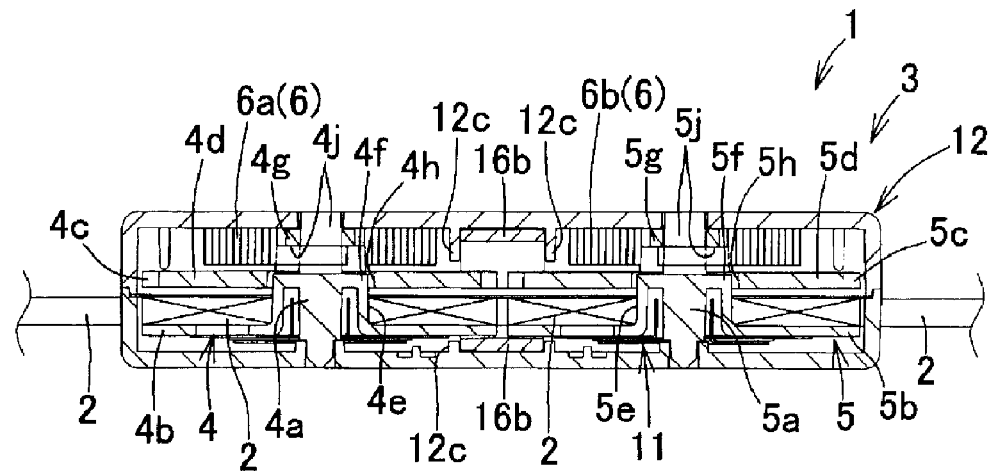
FIG. 3 is a view illustrating a cross section in a rotation shaft of the cord reel according to the first embodiment.
Figure 4:
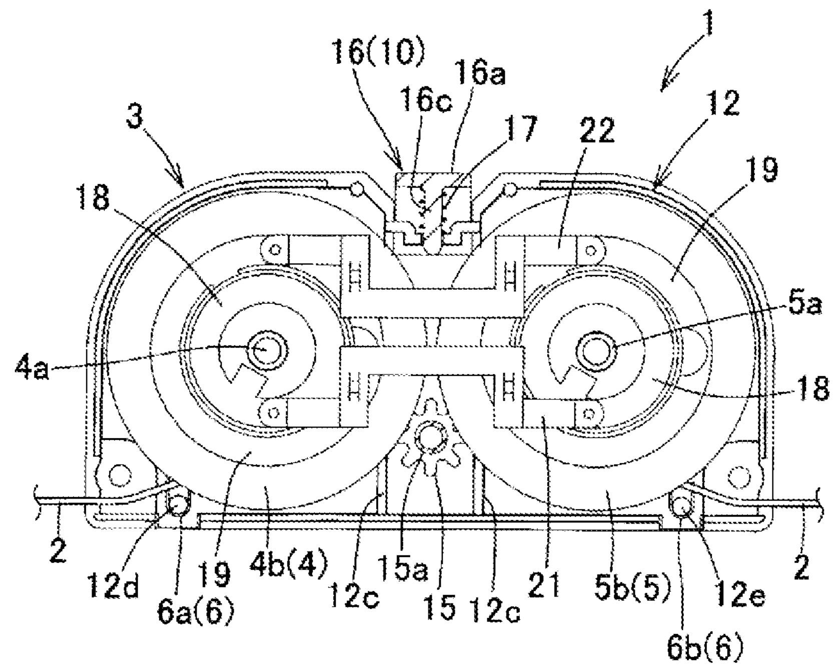
FIG. 4 is a front view illustrating the cord reel according to the first embodiment in such a state that a front dividable case is detached.
Figure 5:
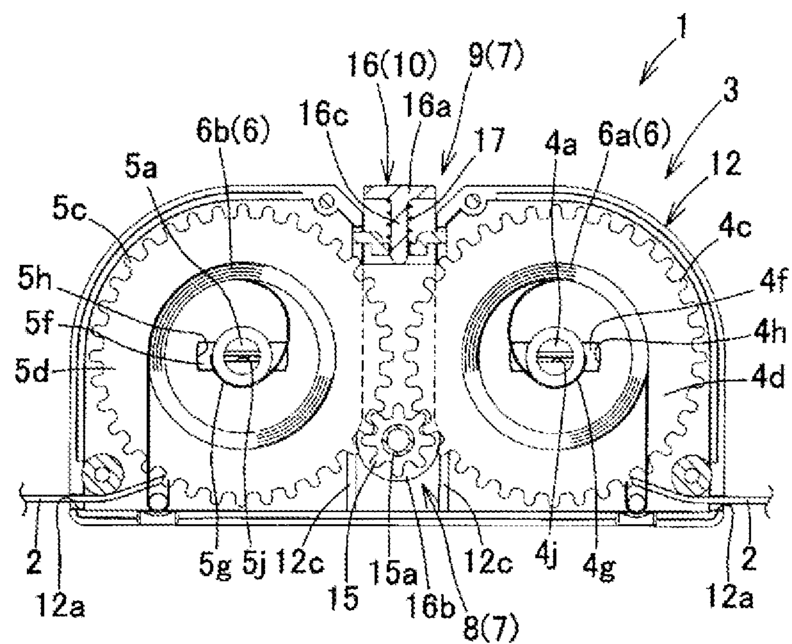
FIG. 5 is a rear view illustrating the cord reel according to the first embodiment in such a state that a back dividable case is detached.
Figure 6:
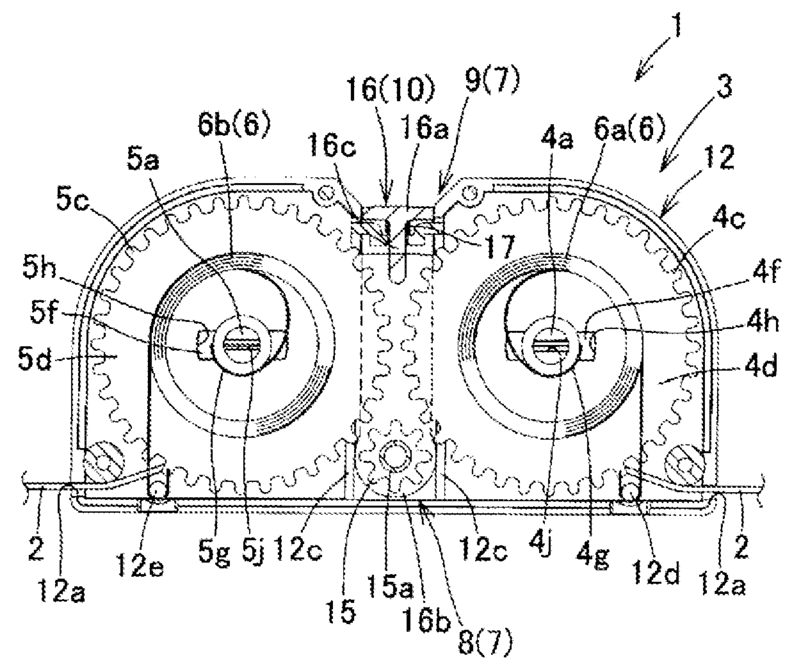
FIG. 6 is an explanatory view illustrating an operation of a bobbin interlock means of the cord reel according to the first embodiment in a releasing state.
Figure 7:
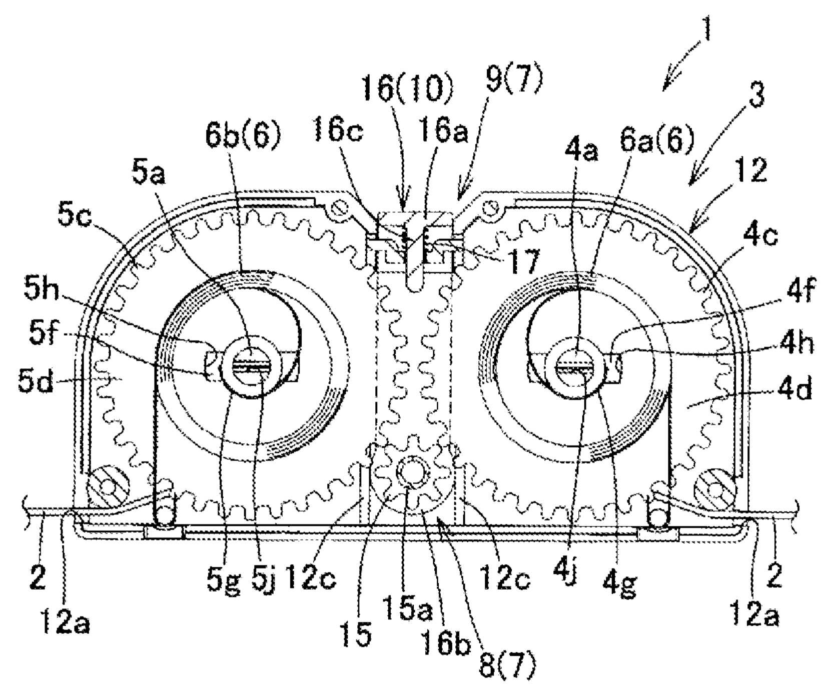
FIG. 7 is an explanatory view illustrating an operation of the bobbin interlock means of the cord reel according to the first embodiment in an interlock releasing state.
Figure 8:
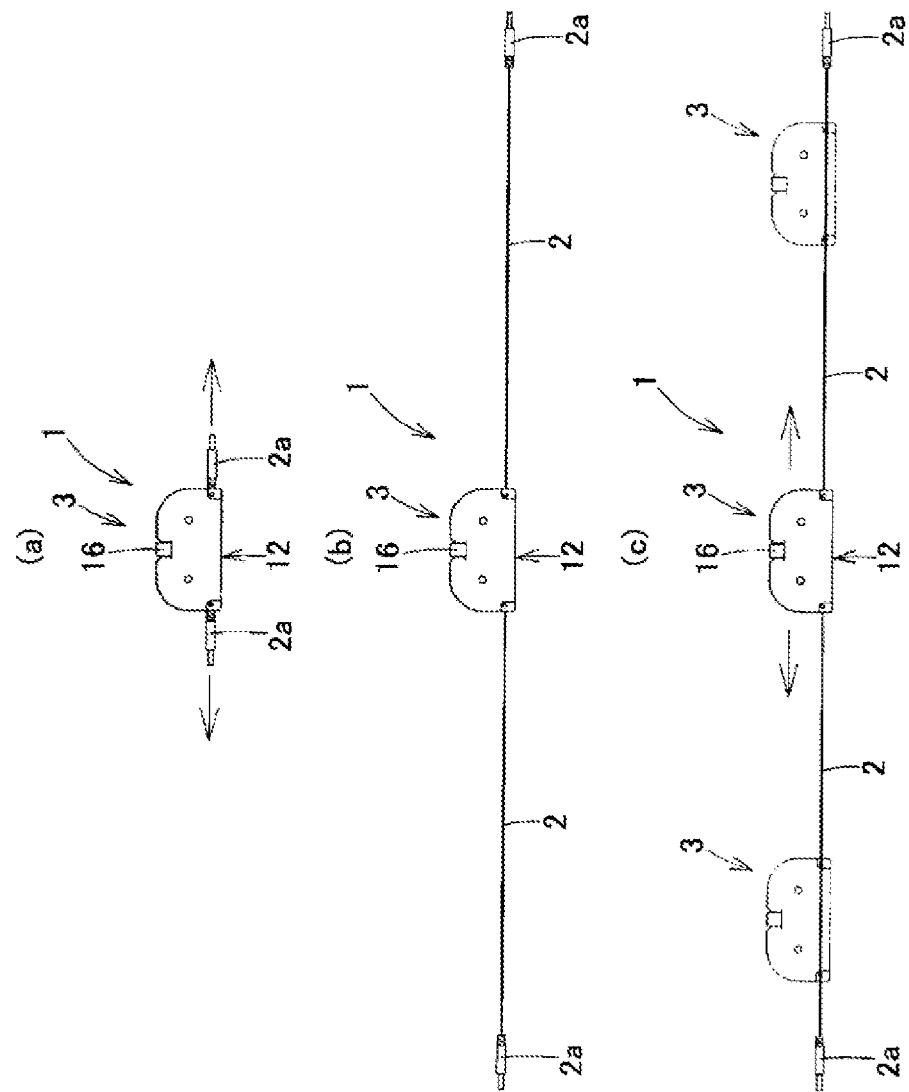
FIGS. 8(*a*) to 8(*c*) are explanatory views illustrating an operation of the cord reel according to the first embodiment.
Figure 9:
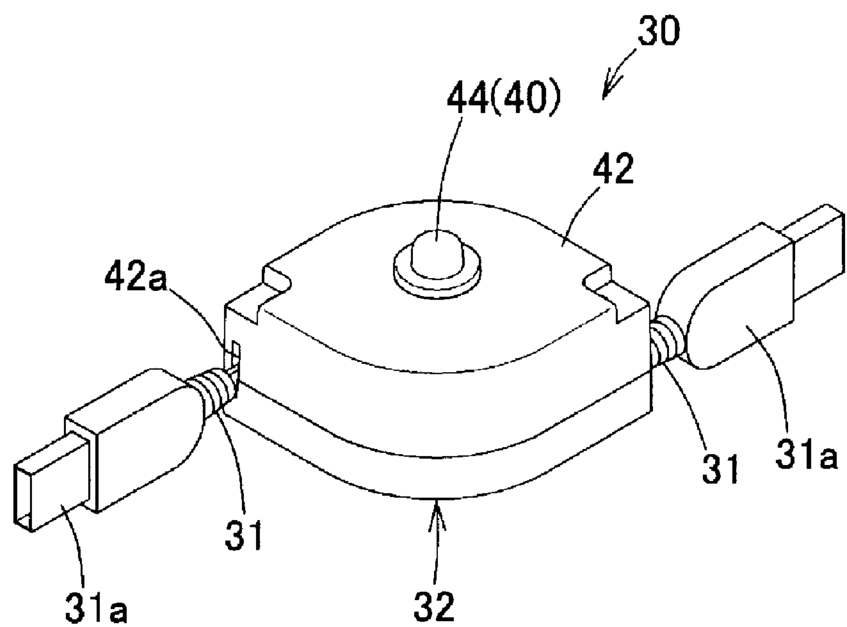
FIG. 9 is a perspective view illustrating a cord reel according to a second embodiment.
Figure 10:
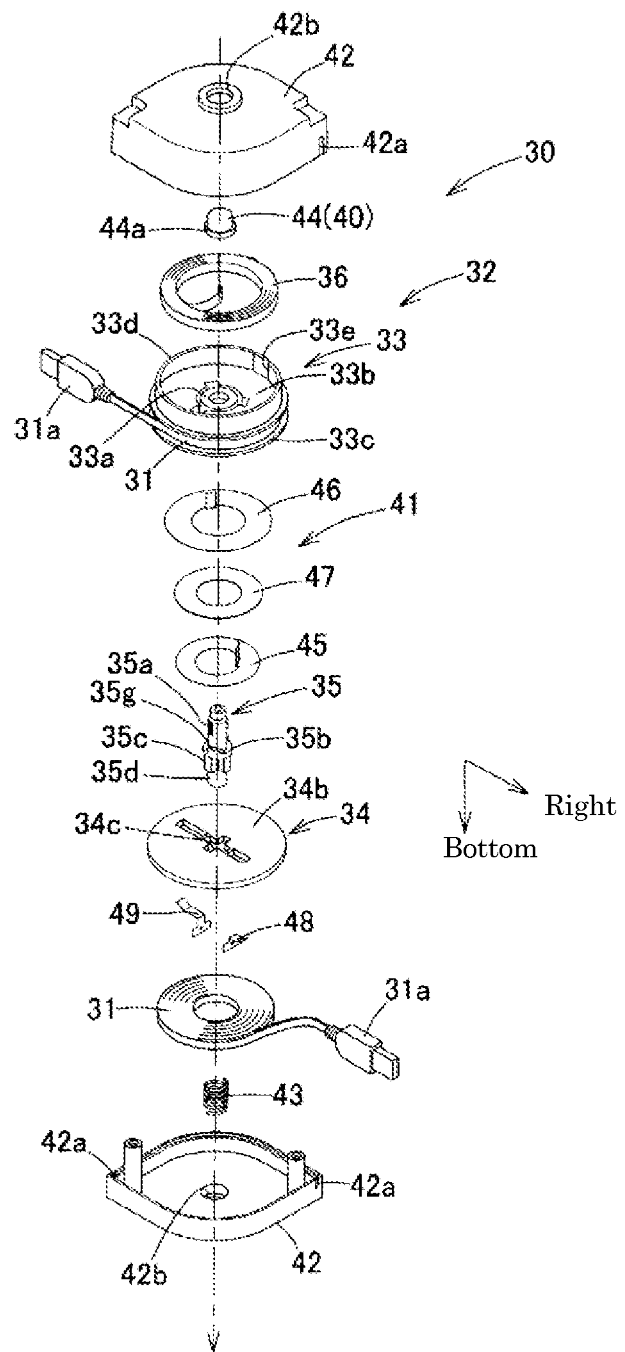
FIG. 10 is an exploded perspective view illustrating the cord reel according to the second embodiment.
Figure 11:
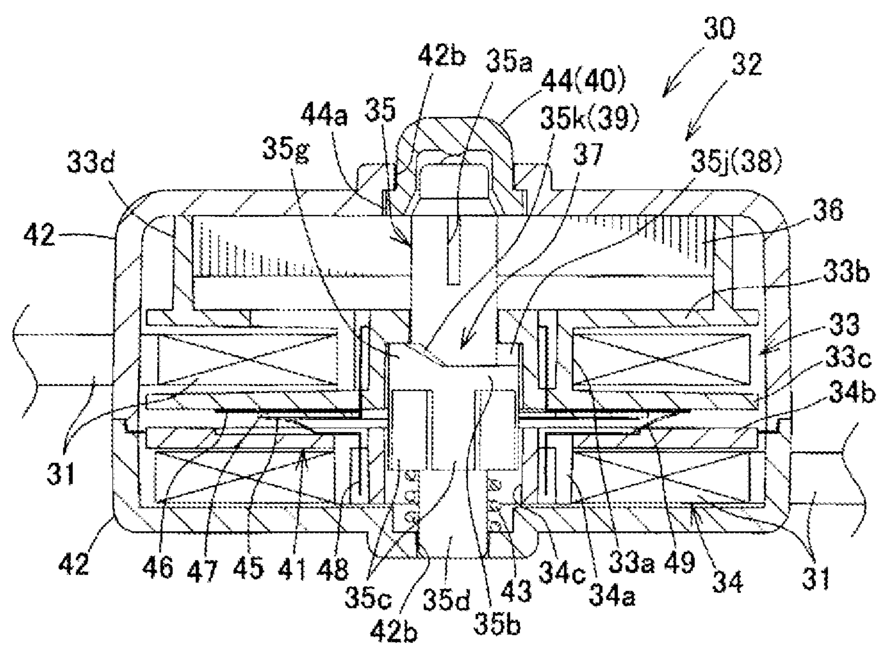
FIG. 11 is a view illustrating a longitudinal section in a rotation shaft of the cord reel according to the second embodiment.
Figure 12:
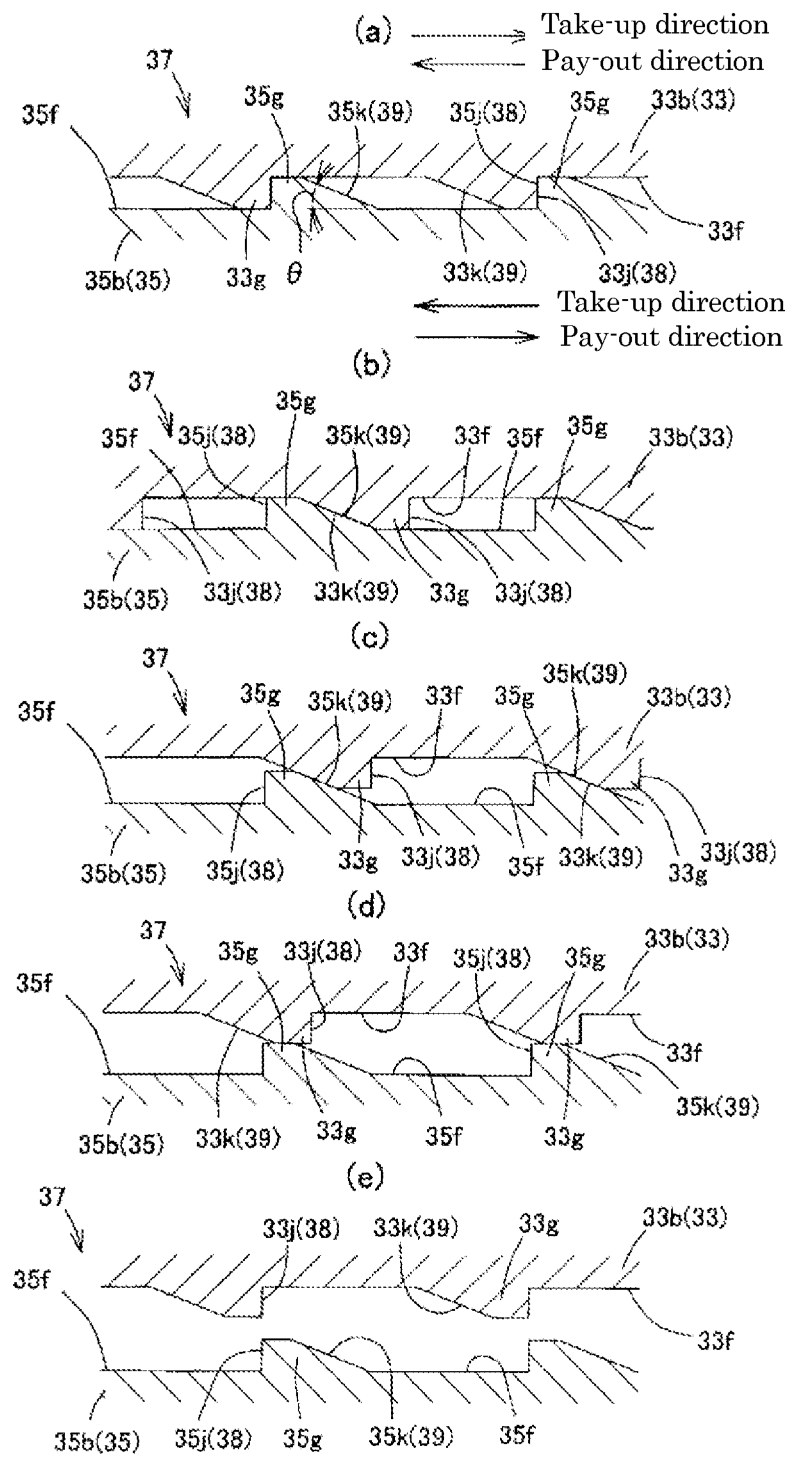
FIGS. 12(*a*) to 12(*e*) are explanatory views illustrating an operation of a bobbin interlock means of the cord reel according to the second embodiment.
Figure 13:
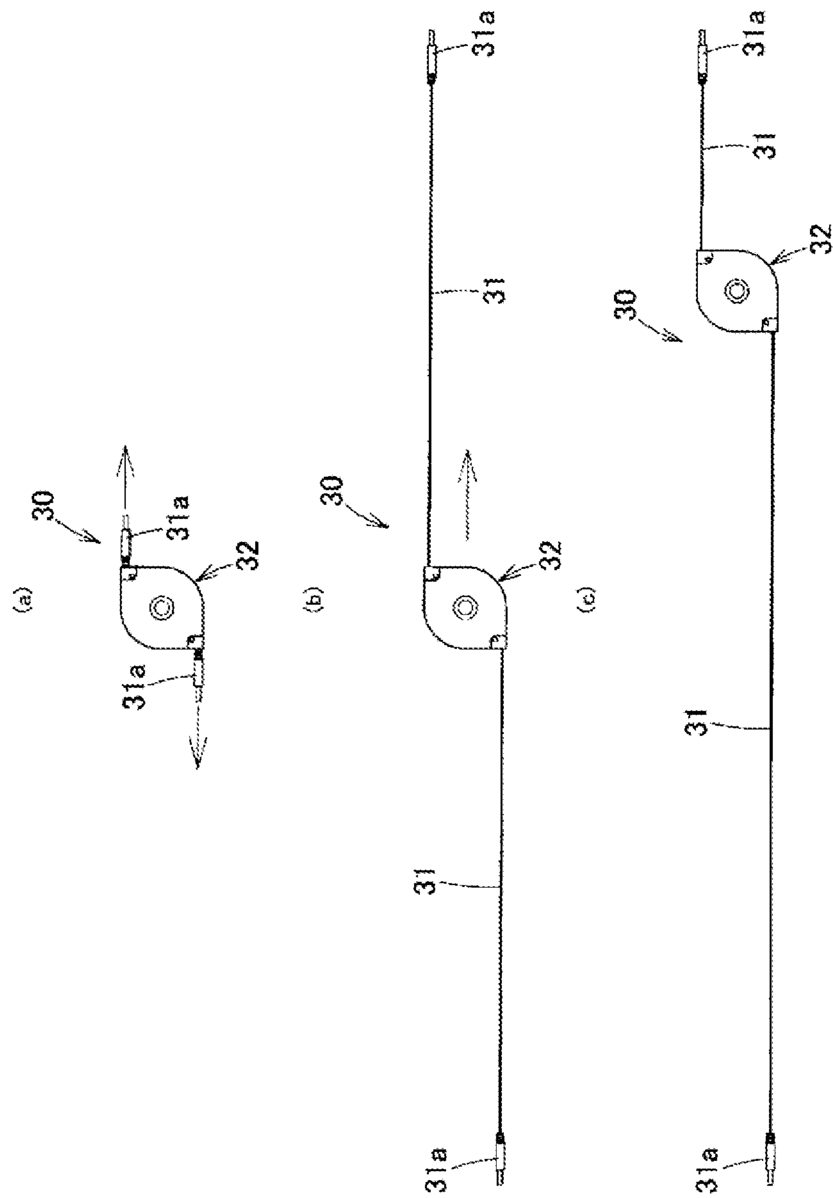
FIGS. 13(*a*) to 13(*c*) are explanatory views illustrating an operation of the cord reel according to the second embodiment.
Figure 14:
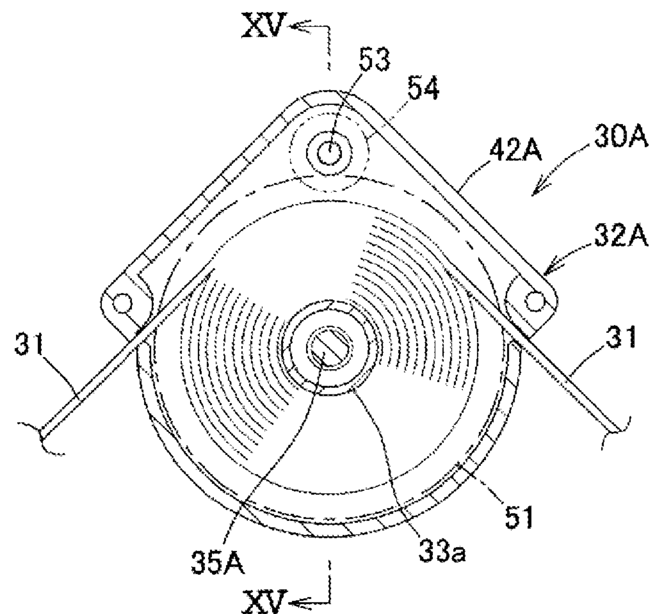
FIG. 14 is a view illustrating a cross section of a cord reel according to another embodiment.
Figure 15:
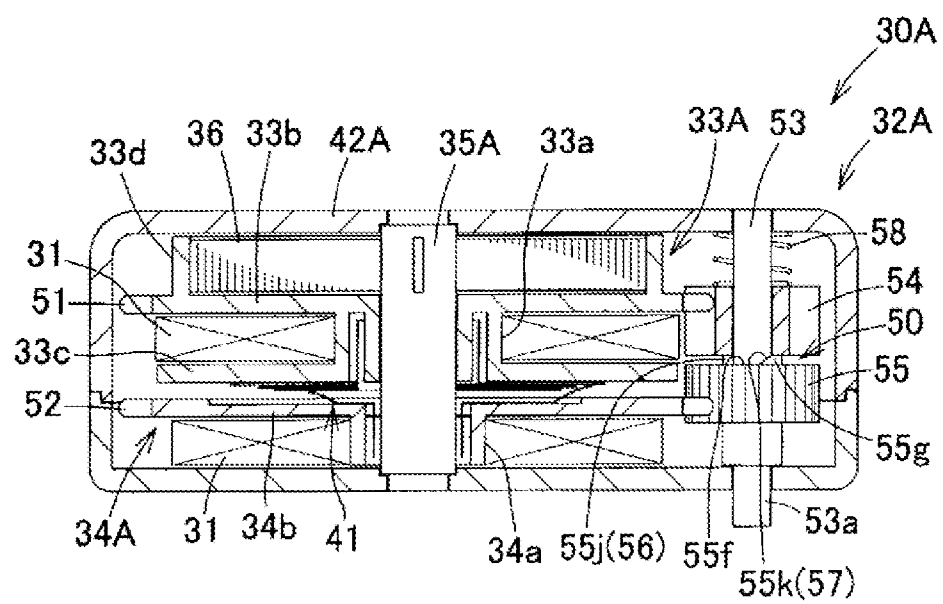
FIG. 15 is a cross sectional view taken along the line XV-XV in FIG. 14.
Figure 16:
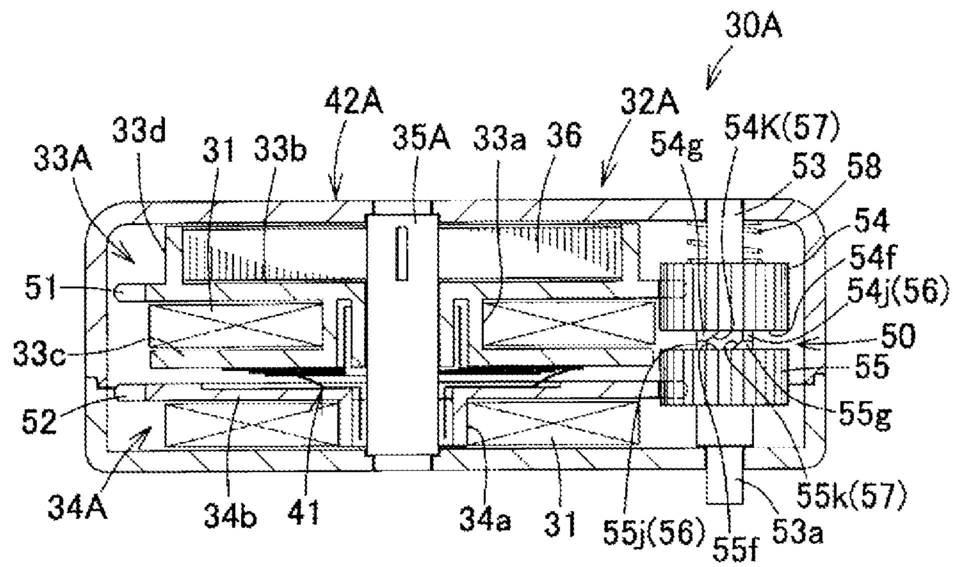
FIG. 16 is an explanatory view illustrating an operation of the cord reel in FIG. 14 in such a state that cords are operated in the pay-out direction.
Figure 17:
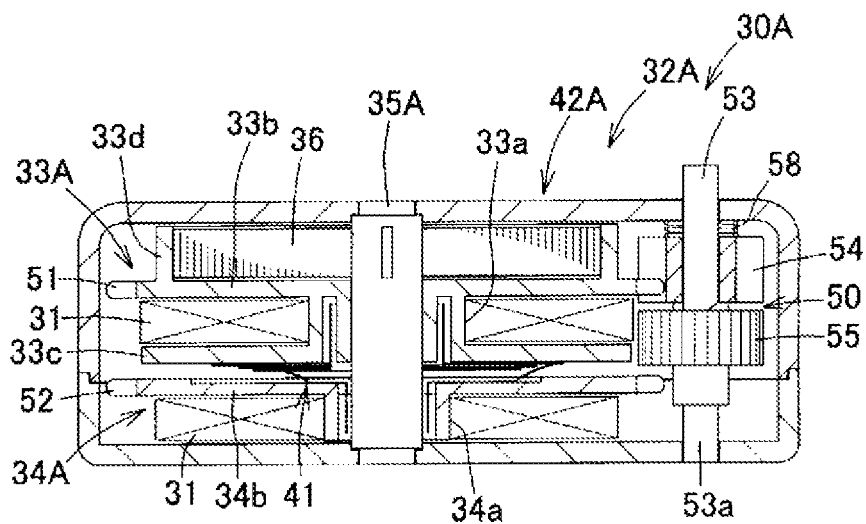
FIG. 17 is an explanatory view illustrating an operation of the cord reel in FIG. 14 in a releasing state.
Figure 18:
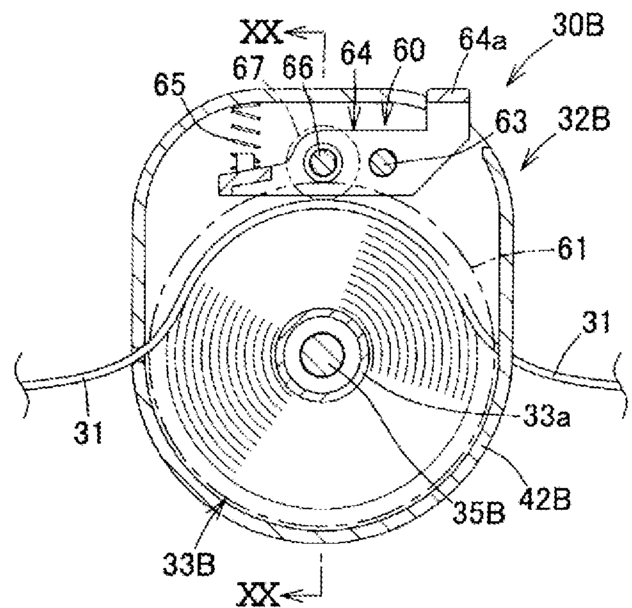
FIG. 18 is a view illustrating a cross section of a cord reel according to yet another embodiment.
Figure 19:
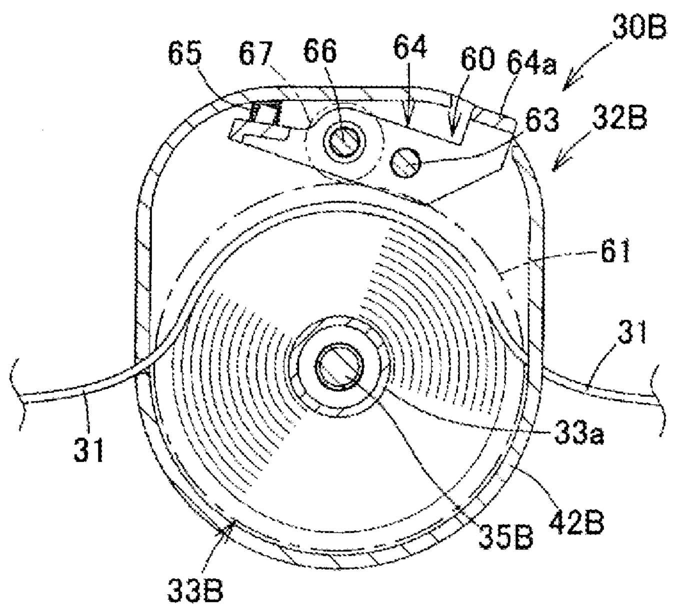
FIG. 19 is an explanatory view illustrating an operation of the cord reel in FIG. 18 in a releasing state.
Figure 20:
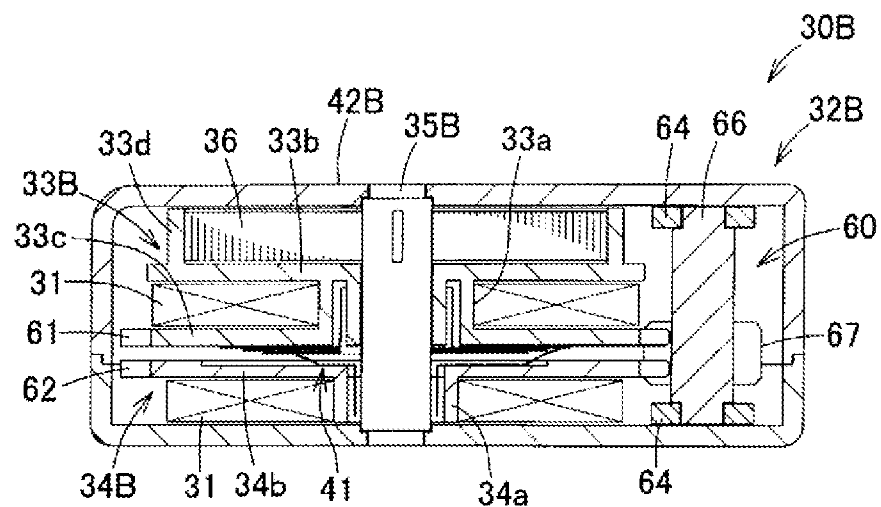
FIG. 20 is a cross sectional view taken along the line XX-XX in FIG. 18.
Figure 21:
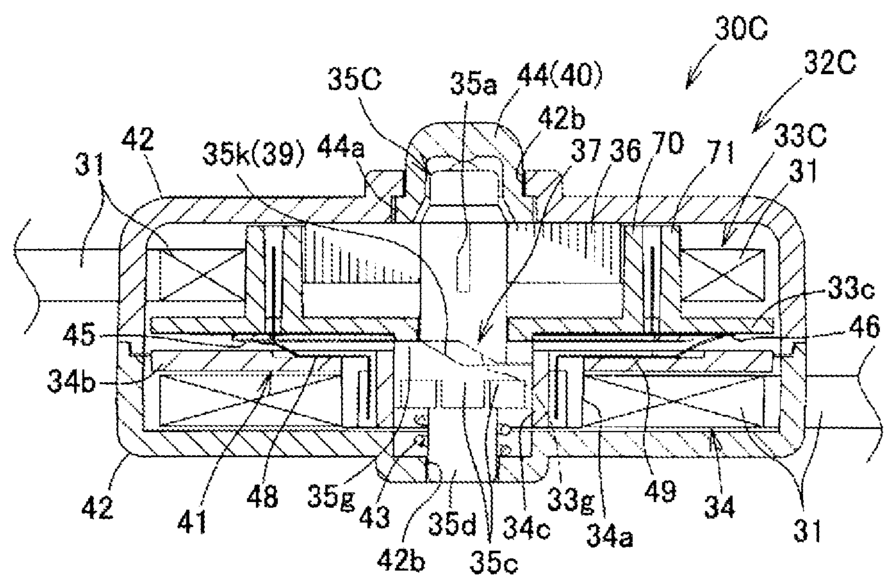
FIG. 21 is a view illustrating a cross section of a cord reel according to yet another embodiment.
Figure 22:
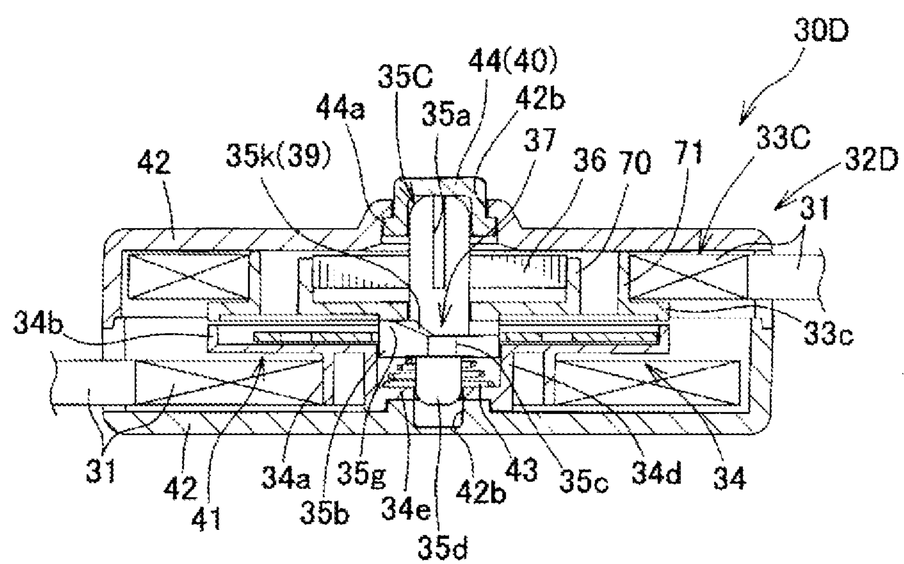
FIG. 22 is a view illustrating a cross section of a cord reel according to yet another embodiment.

1 Cord reel
2 Cord
2*a* Terminal
3 Cord reel body
4 First bobbin
4*a* Rotation shaft
4*b* Front guide plate
4*c* First gear
4*d* Back guide plate
4*e* Tubular portion
4*f* Locking portion
4*g* Sleeve
4*h* Engagement hole
4*j* Slit
5 Second bobbin
5*a* Rotation shaft
5*b* Front guide plate
5*c* First gear
5*d* Back guide plate
5*e* Tubular portion
5*f* Locking portion
5*g* Sleeve
5*h* Engagement hole
5*j* Slit
6 Bobbin biasing means
6*a* Bobbin biasing means
6*b* Bobbin biasing means
7 Bobbin interlock means
8 Rotation interlock means
9 Interlock operating means
10 Releasing means
11 Connecting means

12 Casing
12*a* Ejecting hole
12*b* Supporting hole
12*c* Guide wall portion
12*d* Locking pin
12*e* Locking pin
15 Interlocking gear
15*a* Supporting shaft
16 Operating member
16*a* Operating portion
16*b* Leg portion
16*c* Guide pin
17 Interlock biasing mean
18 Inner contact ring
19 Outer contact ring
20 Insulation sheet
21 Inner connecting piece
22 Outer connecting piece
30 Cord reel
31 Cord
31*a* Terminal
32 Cord reel body
33 First bobbin
33*a* Sleeve
33*b* Upper guide plate
33*c* Lower guide plate
33*d* Tubular housing portion
33*e* Notched portion
33*f* Flat surface
33*g* Convex portion
33*j* Restricting portion
33*k* Interlock operating portion
34 Second bobbin
34*a* Sleeve
34*b* Upper guide plate
34*c* Locking hole
35 Rotation shaft
35*a* Slit
35*b* Flange portion
35*c* Locking convex portion
35*d* Lower shaft portion
35*j* Restricting portion
35*k* Interlock operating portion
35*f* Flat surface
35*g* Convex portion
36 Bobbin biasing means
37 Bobbin interlock means
38 Restricting means
39 Interlock operating means
40 Releasing means
41 Connecting means
42 Casing
42*a* Ejecting hole
42*b* Supporting hole
43 Interlock biasing means
44 Operating cap
44*a* Flange portion
45 Inner contact ring
46 Outer contact ring
47 Insulation sheet
48 Inner connecting piece
49 Outer connecting piece
30A Cord reel
32A Cord reel body
33A First bobbin
34A Second bobbin
35A Rotation shaft
42A Casing
50 Bobbin interlock means
51 First gear
52 Second gear
53 Shaft member
53*a* Operating portion
54 First interlocking gear
54*f* Flat surface
54*g* Convex portion
54*j* Restricting portion
54*k* Interlock operating portion
55 Second interlocking gear
55*f* Flat surface
55*g* Convex portion
55*j* Restricting portion
55*k* Interlock operating portion
56 Restricting means
57 Interlock operating means
58 Interlock biasing means
30B Cord reel
32B Cord reel body
33B First bobbin
34B Second bobbin
35B Rotation shaft
42B Casing
60 Bobbin interlock means
61 First gear
62 Second gear
63 Pivot shaft
64 Operating lever
64*a* Operating portion
65 Interlock biasing means
66 Shaft member
67 Interlocking gear
30C Cord reel
32C Cord reel body
33C First bobbin
35C Rotation shaft
70 Partition portion
71 Partition portion
30D Cord reel
32D Cord reel body
34*d* Inner sleeve
34*e* Spring receiving portion

The invention claimed is:

1. A cord reel comprising:

two cords; and a cord reel body being capable of individually taking up and paying out the two cords, the cord reel body including a first bobbin and a second bobbin on which the respective cords are wound, a bobbin biasing means for continuously biasing the first bobbin and the second bobbin in a take-up direction, a bobbin interlock means for interlocking the first bobbin and the second bobbin, the bobbin interlock means being configured to interlock the first bobbin and the second bobbin in such a manner that, when both of the cords are not being operated in the take-up direction, the bobbin interlock means restricts rotation of the first bobbin and the second bobbin in the take-up direction, that, when the cords are operated in a pay-out direction by an operating force equal to or less than a preset value, the bobbin interlock means allows one of the bobbins to rotate in the pay-out direction and the other bobbin to rotate in the take-up direction in conjunction with the bobbin rotating in the pay-out direction, and that when the cords are operated in the pay-out direction by an operating force greater than the preset value, the bobbin interlock means releases the interlock between the first bobbin and the second bobbin to cause only the operated bobbin to rotate in the pay-out direction, a releasing means for releasing the restriction of the rotation of the first bobbin and the second bobbin in the take-up direction by the bobbin interlock means, and a connecting means for electrically connecting the two cords wound on the first bobbin and the second bobbin.

2. The cord reel as recited in claim 1, wherein the cord wound on the first bobbin and the cord wound on the second bobbin are paid out to both sides of the cord reel body.

3. The cord reel as recited in claim 1 or 2, further including a first rotation shaft for supporting the first bobbin and a second rotation shaft for supporting the second bobbin disposed so as to be parallel with respect to each other with a space between the first rotation shaft and the second rotation shaft, and wherein the bobbin interlock means includes a rotation interlock means for interlockingly rotating the first bobbin and the second bobbin in opposite directions to each other with respect to the take-up direction and the pay-out direction and restricting rotation of the first bobbin and the second bobbin in the take-up direction and an interlock operating means for operating the rotation interlock means in such a manner that when the cords are operated in the pay-out direction by an operating force equal to or less than a preset value, the rotation interlock means interlocks the first bobbin and the second bobbin and that when the operating force is greater than the preset value, the rotation interlock means releases the interlock between the first bobbin and the second bobbin.

4. The cord reel as recited in claim 3, wherein the rotation interlock means includes a first gear provided on an outer circumferential portion of the first bobbin, a second gear provided on an outer circumferential portion of the second bobbin, an interlocking gear detachably meshed with both of the first gear and the second gear and provided so as to be rotatable in an outside of a surface including rotational centers of the first gear and the second gear as well as rotatable on a supporting shaft parallel to both of the rotational centers, and further wherein the interlock operating means includes an interlock biasing means for continuously biasing the interlocking gear in a direction to be meshed with the first gear and the second gear wherein winding directions of the cords with respect to the first bobbin and the second bobbin are set to be opposite directions to each other so that the interlocking gear is moved in a direction to be separated from at least one of the first gear and the second gear by operating the cords in the pay-out direction, and further wherein the releasing means includes an operating member for operating the interlocking gear in a direction to release the mesh between the interlocking gear and the first gear and between the interlocking gear and the second gear.

5. The cord reel as recited in claim 3 or 4, wherein the bobbin biasing means includes a first bobbin biasing means provided between the first rotation shaft and a casing of the cord reel for continuously biasing the first bobbin in the take-up direction of the cord and a second bobbin biasing means provided between the second rotation shaft and the casing of the cord reel for continuously biasing the second bobbin in the take-up direction of the cord.

6. The cord reel as recited in claim 1 or 2, wherein the first bobbin and the second bobbin are provided on a same rotation shaft, and further wherein the cords are wound on the first bobbin and the second bobbin in opposite directions with respect to each other, and further wherein the bobbin interlock means includes a restricting means for restricting relative rotation of the first bobbin and the second bobbin in the take-up direction and an interlock operating means for interlockingly rotating the first bobbin and the second bobbin integrally when the cords are operated in the pay-out direction by an operating force equal to or less than a preset value and releasing the interlocked rotation of the first bobbin and the second bobbin when the operating force is greater than the preset value.

7. The cord reel as recited in claim 6, wherein the bobbin interlock means includes a first bobbin provided on the rotation shaft so as to be relatively rotatable as well as movable in an axial direction with respect to the rotation shaft, a second bobbin provided on the rotation shaft so as to be relatively unrotatable as well as movable in the axial direction with respect to the rotation shaft, facing portions facing with each other in the axial direction and respectively formed on the first bobbin and the rotation shaft, and an interlock biasing means for continuously biasing both of the facing portions in a direction to be pressingly contacted with respect to each other, and further wherein the restricting means includes restricting portions provided on both of the facing portions for restricting relative rotation of the first bobbin and the second bobbin in the pay-out direction of the cords, and further wherein the interlock operating means includes an interlock operating potion for interlockingly rotate the first bobbin and the second bobbin integrally when both of the bobbins are operated to relatively rotate in the pay-out direction by an operating force equal to or less than a preset value and releasing the interlocked rotation of both of the bobbins when the operating force is greater than the preset value, and further wherein the releasing means includes an operating portion formed on the rotation shaft for releasing an engagement of the restricting portions against a biasing force by the interlock biasing means.

* * * * *